United States Patent
Boudou

(10) Patent No.: US 12,078,545 B2
(45) Date of Patent: Sep. 3, 2024

(54) MICROBOLOMETER WITH FILTERING FUNCTION

(71) Applicant: LYNRED, Palaiseau (FR)

(72) Inventor: Nicolas Boudou, Grenoble (FR)

(73) Assignee: LYNRED, Palaiseau (FR)

( * ) Notice: Subject to any disclaimer, the term of this patent is extended or adjusted under 35 U.S.C. 154(b) by 318 days.

(21) Appl. No.: 17/615,361

(22) PCT Filed: Jun. 5, 2020

(86) PCT No.: PCT/EP2020/065680
§ 371 (c)(1),
(2) Date: Nov. 30, 2021

(87) PCT Pub. No.: WO2020/245395
PCT Pub. Date: Dec. 10, 2020

(65) Prior Publication Data
US 2022/0228920 A1  Jul. 21, 2022

(30) Foreign Application Priority Data
Jun. 5, 2019 (FR) .................................. 1905965

(51) Int. Cl.
G01J 5/20       (2006.01)
G01J 5/00       (2022.01)

(52) U.S. Cl.
CPC ......... *G01J 5/20* (2013.01); *G01J 2005/0077* (2013.01)

(58) Field of Classification Search
CPC .... G01J 5/20; G01J 2005/0077; G01J 5/0802; G01J 5/0853
See application file for complete search history.

(56) References Cited

U.S. PATENT DOCUMENTS

| | | | | |
|---|---|---|---|---|
| 2004/0232337 A1* | 11/2004 | Vilain | ..................... | G01J 5/023 250/338.1 |
| 2014/0175284 A1 | 6/2014 | Roh et al. | | |
| 2014/0226021 A1* | 8/2014 | Koechlin | ................. | H04N 5/33 250/338.3 |
| 2022/0236114 A1* | 7/2022 | Boudou | ..................... | G01J 5/20 |

FOREIGN PATENT DOCUMENTS

| | | | |
|---|---|---|---|
| EP | 2743659 A1 | 6/2014 | |
| FR | 2977937 A1 | 1/2013 | |
| WO | 02055973 A2 | 7/2002 | |

OTHER PUBLICATIONS

International Search Report for PCT/EP2020/065680 mailed Aug. 4, 2020.

* cited by examiner

*Primary Examiner* — David P Porta
*Assistant Examiner* — Meenakshi S Sahu
(74) *Attorney, Agent, or Firm* — Perilla Knox & Hildebrandt LLP; Jason M. Perilla

(57) ABSTRACT

The present disclosure relates to a microbolometer comprising an array of pixels, each pixel comprising one or more detection cells, each detection cell comprising an absorption layer (530) forming a quarter-wave cavity (533) having a height (h) of between 1.5 and 5 μm, wherein the pitch of the detection cells in at least one axis in a plane of the pixel array is in the range 2.4 h to 3.6 h.

15 Claims, 32 Drawing Sheets

MICROBOLOMETER WITH FILTERING FUNCTION

The present patent application is a 35 U.S.C. § 371 National Stage Patent Application of Patent Cooperation Treaty Application No. PCT/EP2020/065680, filed on Jun. 5, 2020, and titled "MICROBOLOMETER WITH FILTERING FUNCTION," which claims priority to French patent application no. FR1905965, filed Jun. 5, 2019, the entire contents of both of which applications are hereby incorporated herein by reference.

TECHNICAL FIELD

The present disclosure relates generally to the field of infrared imaging, and in particular to a microbolometer and to a method of manufacturing a microbolometer.

BACKGROUND ART

Microbolometers are a type of uncooled infrared (IR) camera used to capture thermal images of an image scene. Such IR cameras generally comprise an arrangement of IR-sensitive detectors forming a pixel array. Each pixel of the pixel array converts a measured temperature at the pixel into a corresponding electrical signal, generally a voltage, which is in turn converted by an ADC (analog to digital converter) into a digital output signal.

Each pixel of a microbolometer comprises a membrane suspended over a substrate. The membrane comprises an absorption layer that absorbs energy from the IR light hitting the pixel, causing its temperature to rise as a function of the intensity of the IR light. The membrane for example also comprises a thermal layer which has the property that its resistance is modified by this temperature rise, and the pixel can thus be read by detecting the change in resistance of this thermal layer, which is thermally linked to the absorption layer.

It is generally desirable that a microbolometer has a relatively high sensitivity, generally implying a high absorption rate, for the targeted range of wavelengths. It is also desirable that the device is relatively compact and the cost relatively low.

However, there is a technical problem in reducing the dimensions and/or cost of a microbolometer without decreasing its sensitivity. Indeed, the smaller the pixel pitch of a microbolometer, the lower the amount of absorbed power, and the more difficult it is to engineer arms for supporting the absorption layer having relatively high thermal resistance.

SUMMARY OF INVENTION

It is an aim of embodiments of the present disclosure to at least partially address one or more problems in the prior art.

According to one embodiment, there is provided a microbolometer comprising an array of pixels, each pixel comprising one or more detection cells, each detection cell comprising an absorption layer, wherein: the pitch of the detection cells in at least one direction in the plane of pixel array is between 5 and 11 μm; a pixel fill factor FF of the absorption layer of the one or more detection cells in each pixel is in a range 0.10 to 0.50; and a sheet resistance Rs of the absorption layer of each detection cell is between 16 and 189 ohm/sq.

According to one embodiment, a ratio Rs/FF of each pixel of the array is between 200 and 600 ohm/sq.

According to one embodiment, each pixel has a pixel fill factor in the range 0.10 to 0.40.

According to one embodiment, each pixel has a pixel fill factor in the range 0.20 to 0.40.

According to one embodiment, the pitch of the detection cells in at least one direction in the plane of pixel array is between 8 and 9 μm.

According to one embodiment, each pixel of the array has:
  a pixel fill factor FF equal to or greater than 0.40 and less than 0.50 and a sheet resistance Rs of the absorption layer of at least 75 ohm/sq; or
  a pixel fill factor FF equal to or greater than 0.30 and less than 0.40 and a sheet resistance Rs of the absorption layer of at least 50 ohm/sq; or
  a pixel fill factor FF equal to or greater than 0.20 and less than 0.30 and a sheet resistance Rs of the absorption layer of at least 25 ohm/sq; or
  a pixel fill factor FF equal to or greater than 0.10 and less than 0.20 and a sheet resistance Rs of the absorption layer of at least 16 ohm/sq.

According to one embodiment, a ratio Rs/FF is in a range 377 ohm/sq plus or minus 20%.

According to one embodiment, the absorption layer of each detection cell is a metal layer.

According to one embodiment, the absorption layer is formed of TiN and has a thickness of between 10 and 115 nm.

According to one embodiment, the pixel array comprises a substrate, and each pixel of the pixel array comprises a reflective layer formed on the substrate and a membrane suspended over the reflective layer, a quarter-wave cavity being formed between the membrane and the reflective layer in each pixel, and the membrane comprising the absorption layer and a thermal layer.

According to one embodiment, the absorption layer has a surface area of less than 75 percent of the surface area of the membrane.

According to one embodiment, the quarter-wave cavity has a height in the range 1.5 to 3.5 μm.

According to one embodiment, the pitch of the detection cells in at least one direction in the plane of pixel array is less than four times the height of the quarter-wave cavity.

According to a further aspect, there is provided a method of manufacturing a microbolometer array comprising: forming an array of pixels, each pixel having one or more detection cells, wherein forming said array comprising: forming the detection cells to have a pitch of between 5 and 11 μm in at least one axis in the plane of the pixel array; and forming each detection cell to comprise an absorption layer having a pixel fill factor FF in a range 0.10 to 0.50 and a sheet resistance Rs of between 16 and 189 ohm/sq.

According to yet a further aspect, there is provided a microbolometer comprising an array of pixels, each pixel comprising one or more detection cells, each detection cell comprising an absorption layer forming a quarter-wave cavity having a height h of between 1.5 and 5 μm, wherein the pitch of the detection cells in at least one axis in a plane of the pixel array is in the range 2.4 h to 3.6 h.

According to one embodiment, a pixel fill factor FF of the absorption layer of the one or more detection cells in each pixel is in a range 0.20 to 0.70.

According to one embodiment, a pixel fill factor FF of the absorption layer of the one or more detection cells in each pixel is in a range 0.10 to 0.50.

According to one embodiment, the pitch of the detection cells is in the range 4 to 15 µm.

According to one embodiment, the pitch of the detection cells is in the range 5 to 11 µm.

According to one embodiment, the absorption layer is a metal layer having a sheet resistance of 189 ohm/sq or less.

According to one embodiment, the absorption layer is a metal layer having a sheet resistance of 126 ohm/sq or less.

According to one embodiment, the absorption layer is formed of TiN.

According to one embodiment, the cavity height is of between 1.5 and 3.5 µm.

According to one embodiment, each pixel of the array has:
- a pixel fill factor FF equal to or greater than 0.40 and less than 0.50 and a sheet resistance Rs of the absorption layer of at least 75 ohm/sq; or
- a pixel fill factor FF equal to or greater than 0.30 and less than 0.40 and a sheet resistance Rs of the absorption layer of at least 50 ohm/sq; or
- a pixel fill factor FF equal to or greater than 0.20 and less than 0.30 and a sheet resistance Rs of the absorption layer of at least 25 ohm/sq; or
- a pixel fill factor FF equal to or greater than 0.10 and less than 0.20 and a sheet resistance Rs of the absorption layer of at least 16 ohm/sq.

According to one embodiment, the ratio Rs/FF of each pixel of the array is between 200 and 600 ohm/sq.

According to one embodiment, the ratio Rs/FF of each pixel of the array is within 20 percent of 377 ohm/sq.

According to one embodiment, each detection cell comprises a membrane comprising the absorption layer, a thermal layer and a dielectric layer.

According to yet a further aspect, there is provided a method of fabricating a microbolometer, the method comprising forming an array of pixels, each pixel comprising one or more detection cells, wherein forming the array comprises: forming each detection cell to comprise an absorption layer forming a quarter-wave cavity having a height h of between 1.5 and 5 µm; and forming the detection cells to have a pitch, in at least one axis in the plane of the pixel array, in the range 2.4 h to 3.6 h.

BRIEF DESCRIPTION OF DRAWINGS

The foregoing features and advantages, as well as others, will be described in detail in the following description of specific embodiments given by way of illustration and not limitation with reference to the accompanying drawings, in which:

FIGS. 26D and 26E corresponding to a Fabry-Perot cavity height of 1.5 µm and pixel pitches of 3.6 µm and 5.4 µm respectively; FIGS. 26F and 26G corresponding to a Fabry-Perot cavity height of 5 µm and pixel pitches of 12 µm and 18 µm respectively;

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the circuits used for measuring pixel resistances in a microbolometer array have not been described in detail, and nor have the methods for processing captured pixel data in order to generate thermal images.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures, or to a microbolometer as orientated during normal use.

Unless specified otherwise, the expressions "around", "approximately", "substantially" and "in the order of" signify within 10%, and preferably within 5%.

In the following description, the following terms will be considered to have the following definitions:

"absorption layer": a layer that absorbs energy from IR light in a pixel of a microbolometer. In the embodiments of the present disclosure, this layer is formed of a metal such as TiN, Ti or Pt.

"pixel fill factor": the ratio between the surface area of the absorption layer and the pixel surface area. In the present disclosure, the values of the pixel fill factor are provided with an accuracy of two decimal places.

"pixel pitch" or "detection cell pitch": the interval at which the pixels/detection cells are formed in a microbolometer array. The pixel pitch may correspond to the width of each pixel or detection cell in the x or y direction, or the distance from the edge of one pixel or detection cell to the corresponding edge of an adjacent pixel or detection cell. In the present disclosure, the pitches of pixels and of detection cells are provided in micrometers with an accuracy of one decimal place, and in some cases of two decimal places.

Throughout the present disclosure, values of sheet resistance are assumed to be accurate to within 5 percent, and thicknesses expressed in nanometers are assumed to be accurate to the closest nanometer.

Figure 1:
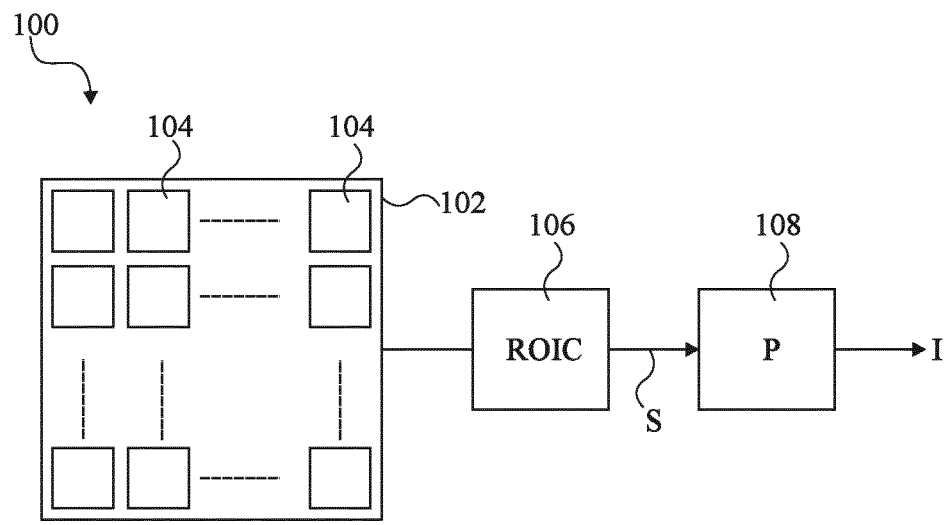
FIG. 1 schematically illustrates image capture circuits of an IR camera according to an example embodiment.

FIG. 1 schematically illustrates an image capture device 100 of an IR camera according to an example embodiment. The device 100 comprises an array 102 of pixels 104 forming a microbolometer that is capable of operating at ambient temperature. The array for example comprises N columns and M rows, where N and M are for example each equal to 2 or more, and can equal over a thousand. An output of the array 102 is coupled to a read circuit 106, which is for example a read out integrated circuit (ROIC). The circuit 106 for example includes one or more analogue to digital converters for converting signals captured in the microbolometer array 102 into digital signals S. The digital signals S are for example provided to a processing device (P) 108 that performs processing of the raw image data in order to generate thermal images I. For example, the device 100 is capable of capturing still thermal images or thermal images forming a video stream.

Figure 2:
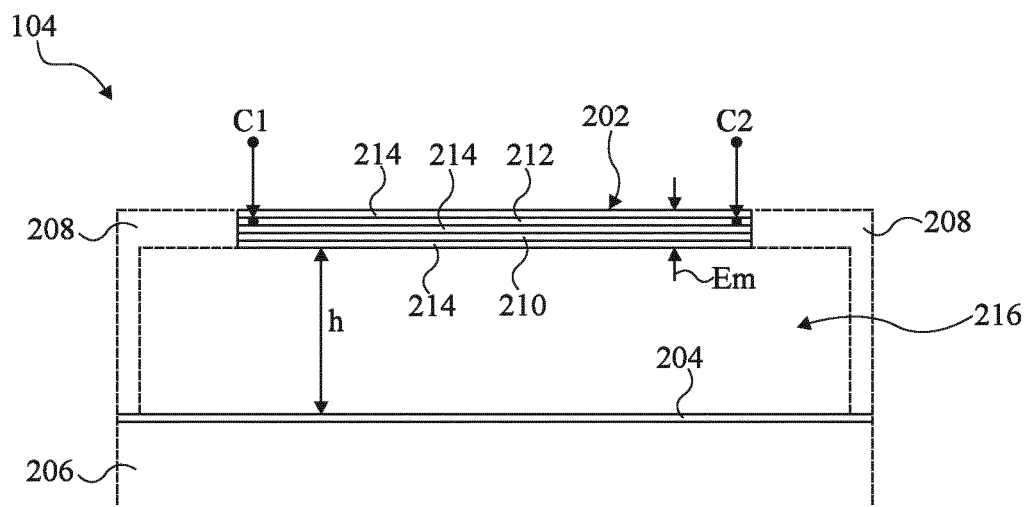
FIG. 2 is a cross-section view of a pixel of a microbolometer according to an example embodiment.

FIG. 2 is a cross-section view of one of the pixels 104 of the microbolometer array 102 of FIG. 1 in more detail. The pixel 104 comprises a membrane 202 suspended over a reflective surface 204 formed on a substrate 206. For example, the membrane 202 is supported by arms 208 that also provide thermal insulation between the substrate 206 and the membrane 202.

The membrane 202 for example comprises, across at least part of its surface area, an absorption layer 210, a thermal layer 212, and dielectric layers 214, one of which isolates the absorption and thermal layers 210, 212 from each other, and a further two of which sandwich the layers 210, 212.

The absorption layer 210 is for example formed of metal, such as TiN, Ti, Pt or another metal. The absorption layer 210 absorbs the energy from infrared light hitting the pixel and is thus heated. This heat is transferred to the thermal layer 212, which is formed of a material having an electrical resistance that varies as a function of temperature. Contacts C1 and C2 close to edges of the thermal layer 212 permit the resistance of the thermal layer of each pixel to be measured by read out circuitry (not illustrated in FIG. 2), via the arms 208.

The thickness Em of the membrane 202 is typically in the range 100 nm to 1 μm.

The space between the membrane 202 and the surface of the reflective layer 204 defines a quarter-wave cavity 216, also known as a Fabry-Perot cavity. Generally, the cavity 216 is filled with air or under a partial vacuum. The height h of this cavity is chosen to achieve a relatively high absorption rate of infrared light at a desired wavelength range by the absorption layer 210 of the membrane 202. In particular, the height h of the cavity is chosen to equal $\lambda tg/4$, where $\lambda tg$ is a target wavelength.

The height h is for example in the range 0.50 to 5.0 μm, and in some embodiments in the range 1.5 to 3.5 μm. In the following, unless stated otherwise, the examples and simulations are based on cavity heights of 2.5 μm, which provides relatively high absorption of light wavelengths centered around 10 μm. Indeed, the spectrum around this wavelength is generally of the most interest for thermal IR applications. However, in alternative embodiments different wavelengths of light could be targeted.

Figure 3:
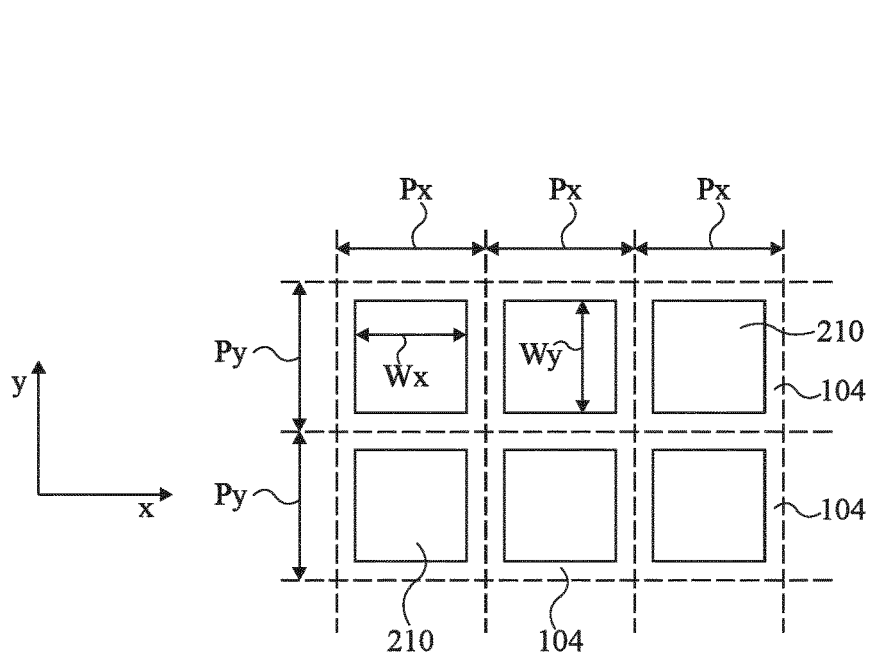
FIG. 3 is a plan view of part of a microbolometer array according to an example embodiment.

FIG. 3 illustrates part of the microbolometer array 102 of FIG. 1 in more detail according to an example embodiment. In FIG. 3, a dashed grid represents the limits of the pixels of the array, and solid rectangles represent the surface area of the absorption layers 210 of each pixel.

An x axis in FIG. 3 is defined as corresponding to the direction, in the plane of the microbolometer array, of the rows of pixels, and a y axis in FIG. 3 is defined as corresponding to the direction, in the plane of the microbolometer array, of the columns of pixels.

The pixels in the microbolometer array for example have a pixel pitch Px in the x direction and pixel pitch Py in the y direction, the pixel pitches Px and Py for example being substantially identical. In the following, when reference is made to a particular value of the pixel pitch, unless stated otherwise, it is assumed that this is the pitch in both the x and y directions. An area Apix of the pixel is equal to Px·Py. The absorption layers 210 for example have widths Wx in the x direction that are shorter than the pitch Px, and widths Wy in the y direction that are shorter than the pitch Py. The surface area Aabs of the absorption layer is thus equal to Wx·Wy. A pixel fill factor FF of the absorption layer within each pixel can be defined as Aabs/Apix.

First Aspect

In order to provide a relatively high absorption rate of the microbolometer, and thus a high sensitivity, the fill factor FF is generally chosen to be as close to 1 as possible, as will now be described with reference to FIG. 4.

Figure 4:
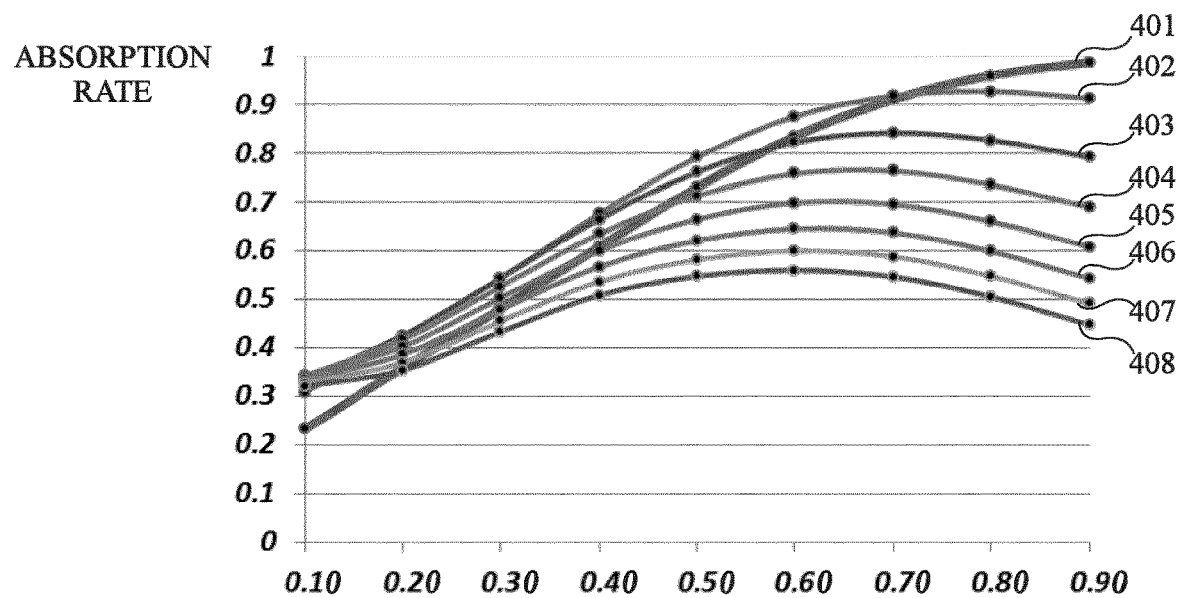
FIG. 4 is a graph showing an absorption rate of an absorption layer of a microbolometer pixel as a function of the pixel fill factor for eight different sheet resistances of the absorption layer in the case of a pixel pitch of 17 µm, a Fabry-Perot cavity height of 2.5 µm and for a light wavelength of 10 µm.

FIG. 4 is a graph representing the absorption rate (ABSORPTION RATE) of a microbolometer pixel, such as the pixel 104 of FIGS. 1 to 3, having a pixel pitch of 17.0 μm, as a function of the fill factor (FF), for eight different sheet resistances of an absorption layer formed of TiN and for a light wavelength of 10 μm. The sheet resistances and thicknesses of the TiN absorption layers corresponding to the curves 401 to 408 of FIG. 4 are indicated in the following table:

TABLE 1

| Curve Reference | TiN Thickness (nm) | Sheet Resistance (ohm/sq) |
|---|---|---|
| 401 | 5 | 377 |
| 402 | 10 | 189 |
| 403 | 15 | 126 |
| 404 | 20 | 94 |

TABLE 1-continued

| Curve Reference | TiN Thickness (nm) | Sheet Resistance (ohm/sq) |
|---|---|---|
| 405 | 25 | 75 |
| 406 | 30 | 63 |
| 407 | 35 | 54 |
| 408 | 40 | 47 |

It can be seen from FIG. 4 that an absorption rate of over 0.9 can be achieved using relatively thin absorption layers of 5 or 10 nm in thickness, and using a fill factor of over 0.65. The best absorption rate is obtained using an absorption layer of 5 nm in thickness and with a fill factor approaching 0.90. However, the achievable fill factor for pixels having a pitch of 17.0 μm is generally around 0.60.

In order to reduce the dimensions of the microbolometer array while maintaining the number of pixels, it would be desirable to reduce the pixel pitch. However, reducing the pixel pitch is difficult to achieve without significantly reducing the fill factor. Furthermore, the curves of FIG. 4 indicate that reducing the fill factor would lead to a significant reduction in the absorption rate, which is undesirable.

The present inventor has found that, surprisingly, when the pixel pitch in at least one axis, and preferably both axes, is reduced to a value in the range 5 to 11 μm, and preferably to a value in the range 8 to 9 μm, a high absorption rate can still be achieved by using a relatively low fill factor of between 0.10 and 0.50, and selecting an absorption layer 210 having a sheet resistance of between 16 and 189 ohm/sq, and in some embodiments of between 16 and 130 ohm/sq.

Reducing the sheet resistance of the absorption layer implies increasing its thickness. For example, for an absorption layer of TiN, the thickness is of at least 10 nm in order to achieve a sheet resistance of less than 200 ohm/sq, and of at least 15 nm in order to achieve a sheet resistance of less than 130 ohm/sq.

Such an increase in the thickness of the absorption layer can increase the thermal conduction between the absorption layer and the substrate, which could lead to poor performance. In particular, with reference to the pixel of FIG. 2, increasing the thickness of the layer 210 will increase the thermal conduction to the substrate 206 via the arms 208, leading to reduced sensitivity. A modified pixel having a relatively low fill factor and relatively low thermal conduction with the substrate will now be described in more detail with reference to FIG. 5.

Figure 5:
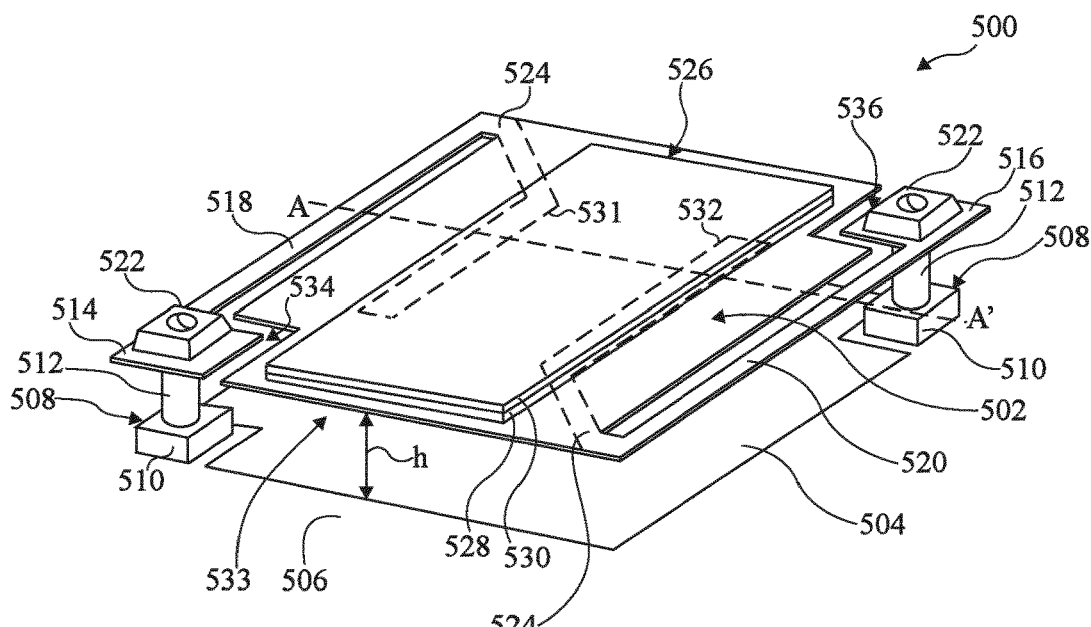
FIG. 5 is a perspective view of a pixel of a microbolometer according to an example embodiment of the present disclosure.

FIG. 5 is a perspective view of a pixel 500 of a microbolometer according to an example embodiment of the present disclosure.

The pixel 500 for example comprises a membrane 502 suspended over a reflective layer 504 formed on a substrate 506.

The membrane 502 is for example supported by a pair of arms 518, 520, which are respectively anchored to two pillars 508 formed at opposite corners of the pixel. Each pillar 508 comprises a base portion 510, from which extends a column 512. The columns 512 of the two pillars pass through respective end portions 514, 516 of the arms 518, 520 and into caps 522. The arms 518, 520 link the pillars to the membrane 502, and provide, in particular, the functions of mechanically supporting the membrane 502, of providing an electrical connection between the membrane 502 and the ROIC (not illustrated in FIG. 5) formed for example in the substrate 506, and of providing thermal insulation between the membrane 502 and the substrate 506. In order to provide good thermal insulation, the arms 518, 520 are for example relatively long, providing relatively high thermal resistance. Indeed, in the example of FIG. 5, the arms 518, 520 extend parallel to, and separate from, opposite edges of the membrane 502, and are attached to opposite corners of the membrane 502 via linking portions 524. Thus the arms 518, 520 for example extend substantially the length of one edge of the membrane 502. In some embodiments, each of the arms 518, 520 has a length of at least 50 percent of the pixel pitch.

The membrane 502 for example comprises, in a portion of its surface area, a stack 526 comprising a thermal layer 528 and an absorption layer 530, these layers for example being insulated from each other by dielectric layers (not illustrated in FIG. 5). For example, the stack 526 occupies less than 75% of the surface area of the membrane 502, including the surface of the arms 518, 520. The region of the membrane 502 surrounding the stack 526 forms a support layer for the stack 526, and also provides an electrical connection between points close to the edges of the thermal layer 528 and the arms 518, 520 such that the resistance of the thermal layer 528 can be measured by the read out circuitry. For example, dashed lines in FIG. 5 represent a footprint of electrical connections 531, 532 respectively extending from the arms 518, 520 to opposite edges of the thermal layer 528. These electrical connections 531, 532, and the arms 518, 520 are for example formed by a metallic layer of TiN, Ti, Pt, or another metal, sandwiched between dielectric layers, formed for example of silicon nitride, silicon dioxide, silicon oxynitride, or other electrically insulating material.

While in the embodiment of FIG. 5 the absorption layer 530 is formed over the thermal layer 528, in alternative embodiments the order could be inversed, the absorption layer 530 for example being formed on an underside of the membrane 502.

A cavity 533 between the reflective layer 504 and the membrane 502 forms a quarter-wave cavity of height h. In one example, this height h is of 2.5 μm in order to target light wavelengths of around 10 μm, although in alternative embodiments different heights, for example in the range 1.5 to 3.5 μm could be used to target different wavelengths of light.

In the example of FIG. 5, the membrane 502 is substantially square, but includes cutouts 534, 536 at opposite corners permitting space for the pillars 508. The stack 526 is for example formed in a portion of the membrane 502 between these cutouts, and thereby extends nearly the full length of the membrane 502.

Of course, while FIG. 5 provides one example of implementation of a microbolometer having an absorption layer of relatively low sheet resistance, it will be apparent to those skilled in the art that many different implementations would be possible, for example omitting the base portions 510 and/or the caps 522, and/or using different forms for the arms 518, 520 and electrical connections 531, 532.

Figure 6:
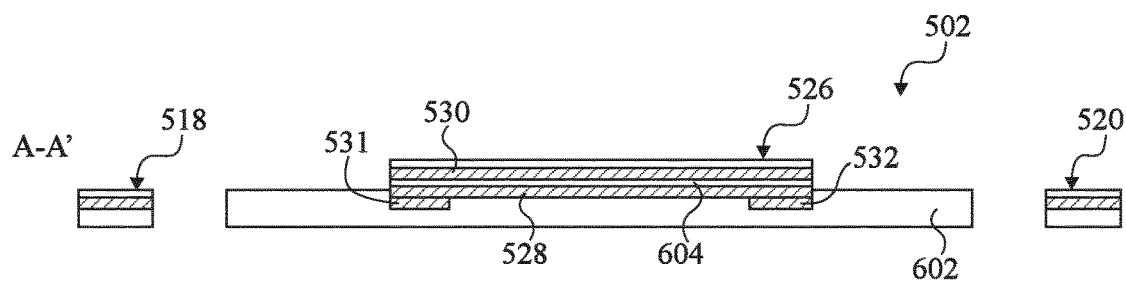
FIG. 6 is a cross-section view of part of the pixel of FIG. 5 according to an example embodiment of the present disclosure.

FIG. 6 is a cross-section view taken along a line A-A' of FIG. 5 passing through the membrane 502 and through the arms 518, 520.

As illustrated in FIG. 6, the membrane 502 is for example formed of a dielectric layer 602, in which are formed the electrical connections 531, 532, for example by metal deposition. The thermal layer 528 and absorption layer 530 are for example electrically insulated from each other by a dielectric layer 604, and regions close to the edges of the underside of the thermal layer 528 for example contact top surfaces of the electrical connections 531, 532, which are otherwise covered by dielectric material. In one embodiment, the absorption layer 530 is a layer of TiN having a thickness of at least 10 nm, and in some cases of at least 15 nm. The thermal layer 528 for example has a thickness of around 100 nm.

It should be noted that while the electrical connections 531, 532 add to the absorbent surface area of the pixel, given the relatively low thickness and high sheet resistance of these metal layers, the present inventor has found that they have a relatively small impact on the effective optical fill factor of the pixel, and can thus be ignored.

Figure 7:
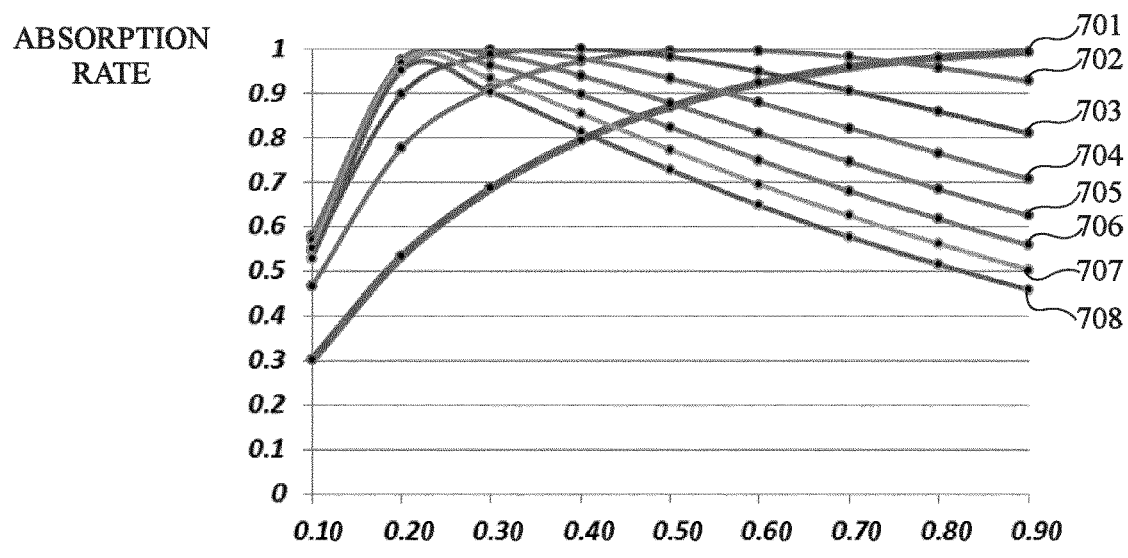
FIG. 7 is a graph showing an absorption rate of an absorption layer of a microbolometer pixel as a function of the pixel fill factor for eight different sheet resistances of the absorption layer in the case of a pixel pitch of 8.5 µm, a Fabry-Perot cavity height of 2.5 µm and for a light wavelength of 10 µm.

FIG. 7 is a graph representing the absorption rate (ABSORPTION RATE) of an absorption layer, as a function of the fill factor (FF) of a microbolometer pixel, such as the pixel 500 of FIG. 5, and having a pitch of 8.5 µm, for eight different sheet resistances of the absorption layer 530. As with the example of FIG. 4, FIG. 7 is based on a quarter-wave cavity having a height of 2.5 µm and a light wavelength of 10 µm. The absorption layer 530 is assumed to be formed of TiN, and the sheet resistances of the absorption layer 530 corresponding to the curves 701 to 708 of FIG. 7 are the same as those of the curves 401 to 408 of Table 1 respectively.

It can be seen in FIG. 7 that, in the case of the curves 702 to 708, the best absorption rates can be achieved when the fill factor is equal to 0.50 or lower, and 0.40 or lower in the case of the curves 703 to 708.

It can be seen from FIG. 7 that, below a fill factor of 0.20, the absorption rate falls rapidly, even for the thickest absorption layers. Therefore, in some embodiments, the fill factor could be chosen to be equal to or greater than 0.20.

Thus it can be seen from FIG. 7 that a microbolometer having a relatively low pixel pitch and a high absorption rate can be achieved by reducing the fill factor of the absorption layers of each pixel to the range 0.1 to 0.5, and also reducing the sheet resistance of the absorption layers to less than 189 ohm/sq, and in some embodiments to less than 130 ohm/sq.

Examples of microbolometer arrays having fill factors of 0.5 or less will now be described in more detail with reference to FIGS. 8 and 9.

Figure 8:
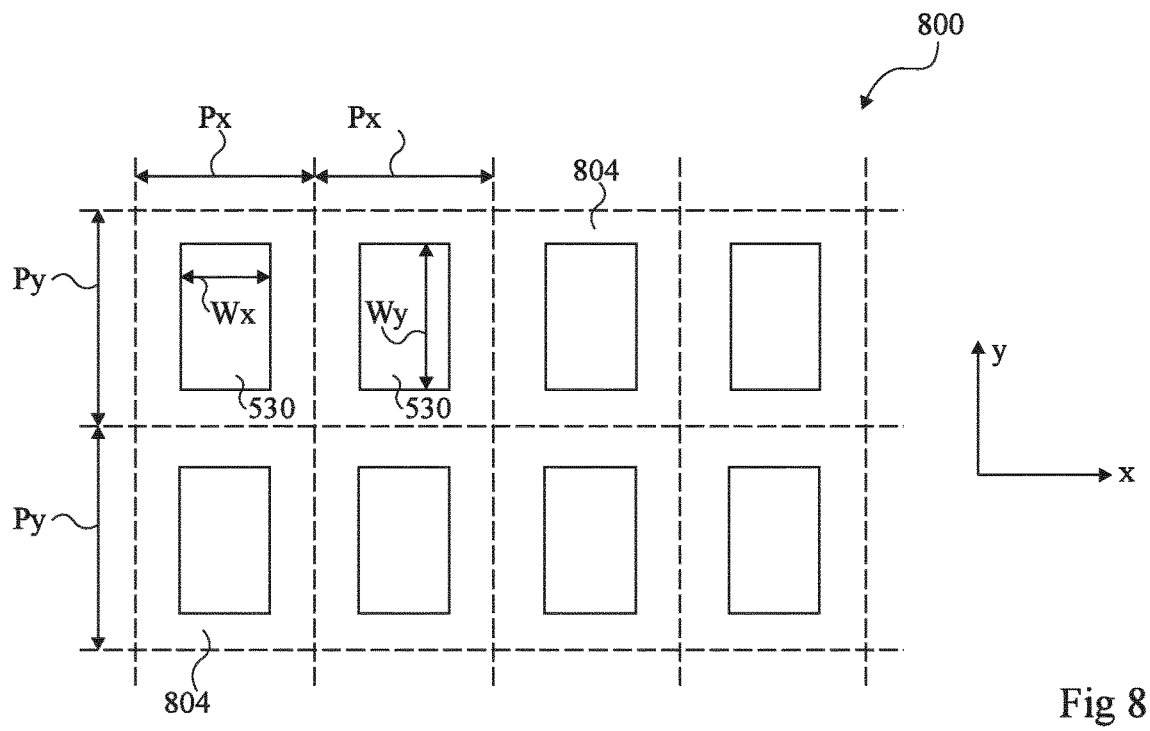
FIG. 8 is a plan view of part of a microbolometer array according to an example embodiment of the present disclosure.

FIG. 8 illustrates part of a microbolometer array 800 according to one example embodiment. Like in FIG. 3, a dashed grid represents the limits of the pixels 804 of the array and solid rectangles represent the surface area of each absorption layer 530. However, with respect to the example of FIG. 3, the pixel fill factor FF has been reduced in the array of FIG. 8, for example to a value in the range 0.10 to 0.50. Furthermore, the absorption layers 530 are not square, but rectangular in FIG. 8, the widths Wx in the x axis being lower than the widths Wy in the y axis. The pixels are for example square, the pixel pitch Px in the x direction being equal to the pixel pitch Py in the y direction, although in some embodiments these pitches could be different. The pitches Px and Py are each for example in the range 5.0 to 11.0 µm.

In the example of FIG. 8, each pixel 804 of the array corresponds to a detection cell comprising a single absorption layer 530. In alternative embodiments, each pixel may comprise more than one detection cell, as will now be described in relation with FIG. 9.

Figure 9:
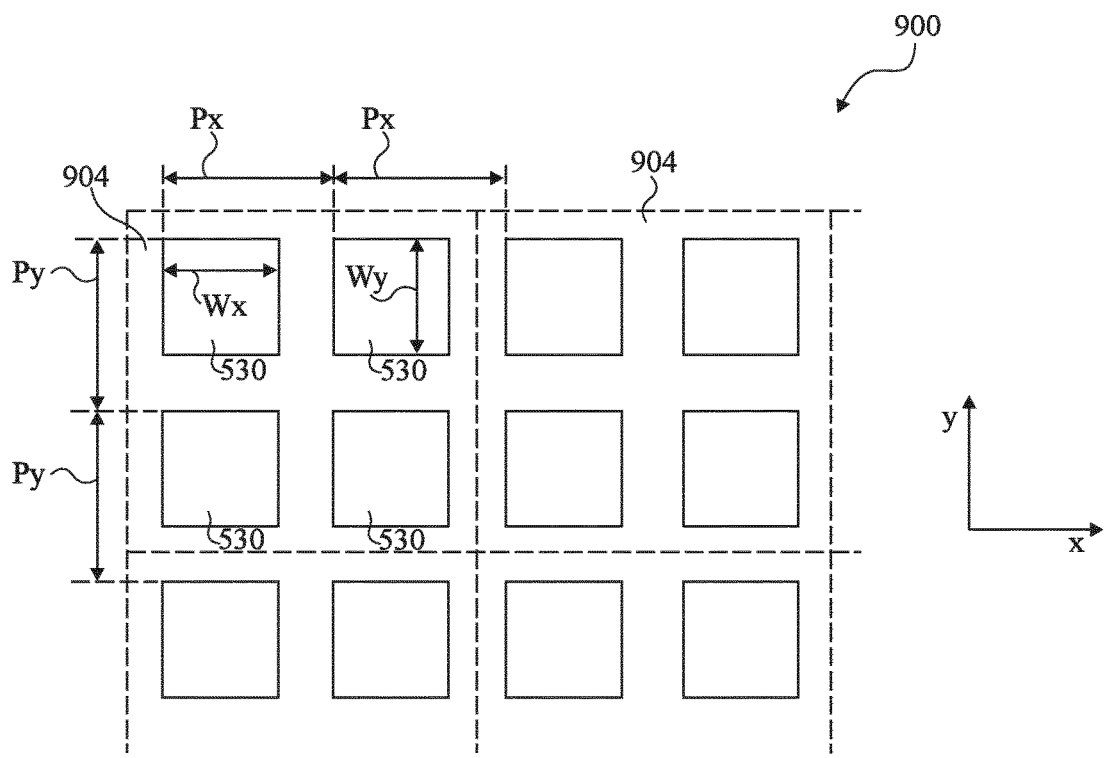
FIG. 9 is a plan view of part of a microbolometer array according to a further example embodiment of the present disclosure.

FIG. 9 illustrates part of a microbolometer array 900 of a microbolometer according to a further example embodiment. In the example of FIG. 9, a dashed grid represents the limits of the pixels 904 of the array and solid rectangles represent the surface area of the absorption layers 530. Each pixel 904 comprises more than one detection cell, each detection cell having a corresponding absorption layer 530. In the example of FIG. 9, each pixel 904 comprises a two-by-two arrangement of four detection cells. The detection cells of each pixel 904 are for example coupled together such that they generate a single pixel value, and thus each group of detection cells can be considered to form a single pixel of the array.

The pixel fill factor FF in the case of FIG. 9 becomes equal to the ratio Aabs/Apix, where Apix is the surface area of each pixel, and Aabs is the combined surface area of the absorption layers 530 in each pixel.

The relevant pitch in the case of FIG. 9 is no longer the pixel pitch, but the pitch of the detection cells, in other words of the absorption layers 530. These pitches are labelled Px and Py in the x and y directions respectively in FIG. 9. For example, these pitches Px, Py are each measured from an edge of one absorption layer 530 to the corresponding edge of the adjacent absorption layer 530.

Figure 10:
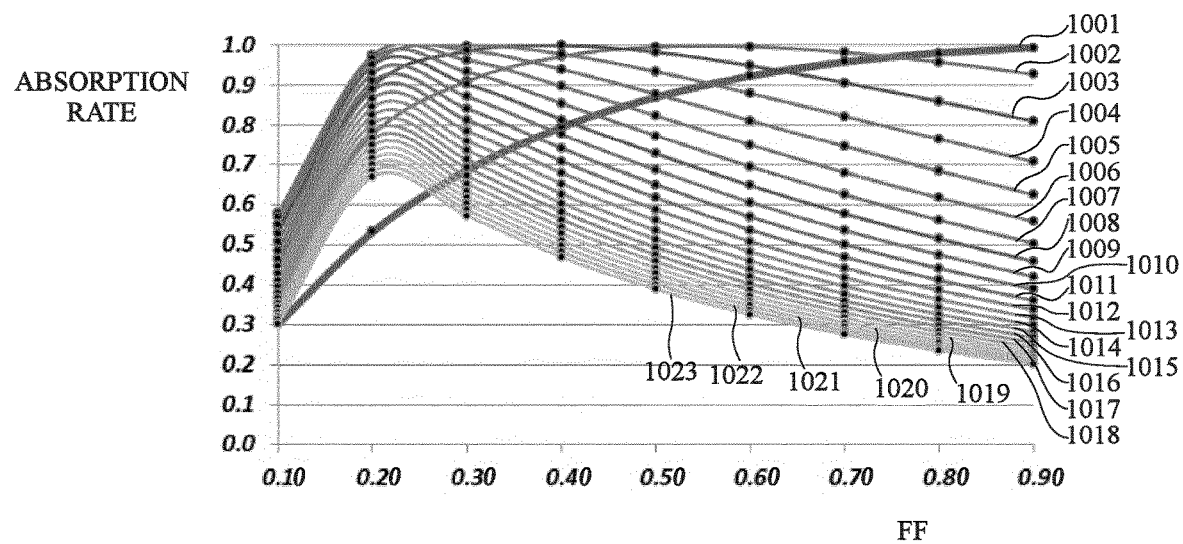
FIG. 10 is a graph showing an absorption rate of an absorption layer of a microbolometer pixel as a function of the pixel fill factor for many different sheet resistances of the absorption layer in the case of a pixel pitch of 8.5 µm, a Fabry-Perot cavity height of 2.5 µm and for a light wavelength of 10 µm.

FIG. 10 is a graph similar to that of FIG. 7, for the same types of microbolometer pixels, but showing further curves for sheet resistances down to 16 ohm/sq. Indeed, the curves 1001 to 1008 of FIG. 10 represent absorption layers having the same sheet resistances as those of the curves 401 to 408 of Table 1. The curves 1009 to 1023 correspond to the sheet resistances and TiN thicknesses indicated in the following table.

TABLE 2

| Curve Reference | TiN Thickness (nm) | Sheet Resistance (ohm/sq) |
|---|---|---|
| 1009 | 45 | 42 |
| 1010 | 50 | 38 |
| 1011 | 55 | 34 |
| 1012 | 60 | 31 |
| 1013 | 65 | 29 |
| 1014 | 70 | 27 |
| 1015 | 75 | 25 |
| 1016 | 80 | 24 |
| 1017 | 85 | 22 |
| 1018 | 90 | 21 |
| 1019 | 95 | 20 |
| 1020 | 100 | 19 |
| 1021 | 105 | 18 |
| 1022 | 110 | 17 |
| 1023 | 115 | 16 |

It can be seen from FIG. 10 that providing microbolometer pixels having fill factors of between 0.10 and 0.50 and sheet resistances of between 16 and 189 ohm/sq can allow the pixel pitch to be significantly reduced (down to 8.5 µm in the example of FIG. 10), while obtaining absorption rates of at least 0.3, or at least 0.45 in the case the sheet resistance is between 42 and 126 ohm/sq.

Furthermore, while lower sheet resistance levels of less than 50 ohm/sq may not reach absorption rates close to 1.0, for fill factors of between 0.10 and 0.30 they can provide significant gains with respect to the use of an absorption layer having a sheet resistance close to 377 ohm/sq, corresponding to the curve 1001, as will now be explained in more detail with reference to FIGS. 11 to 13.

Figure 11:
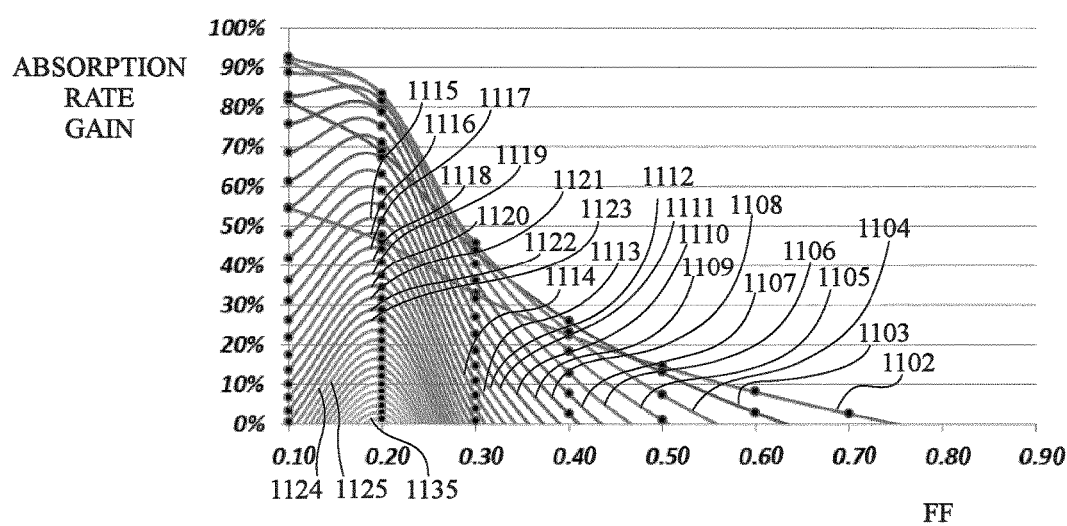
FIG. 11 is a graph showing an absorption rate gain of an absorption layer of a microbolometer pixel as a function of the pixel fill factor for many different sheet resistances of the absorption layer in the case of a pixel pitch of 8.5 µm, a Fabry-Perot cavity height of 2.5 µm and for a light wavelength of 10 µm.

FIG. 11 is a graph showing curves 1102 to 1135 representing a gain in absorption with respect to the absorption layer represented by curve 1001 in FIG. 10. In particular, the curves 1102 to 1123 of FIG. 11 represent the gain of the absorption layers corresponding to curves 1002 to 1023 of FIG. 10. Curves 1124 to 1135 in FIG. 11 represent absorption layers having thicknesses in 5 nm increments from 120 to 190 nm. The curves 1126 to 1134 are not labelled in FIG. 11, but can be easily identified by their order between the curves 1125 and 1135.

It can be seen from FIG. 11 that detectable gains can be achieved when either:
- the pixel fill factor is equal to or greater than 0.40 and less than 0.50 and the sheet resistance is between 75 and 189 ohm/sq; or
- the pixel fill factor is equal to or greater than 0.30 and less than 0.40 and the sheet resistance is between 47 and 189 ohm/sq; or
- the pixel fill factor is equal to or greater than 0.20 and less than 0.30 and the sheet resistance is between 25 and 189 ohm/sq; or
- the pixel fill factor is equal to or greater than 0.10 and less than 0.20 and the sheet resistance is between 16 and 189 ohm/sq.

Figure 12:
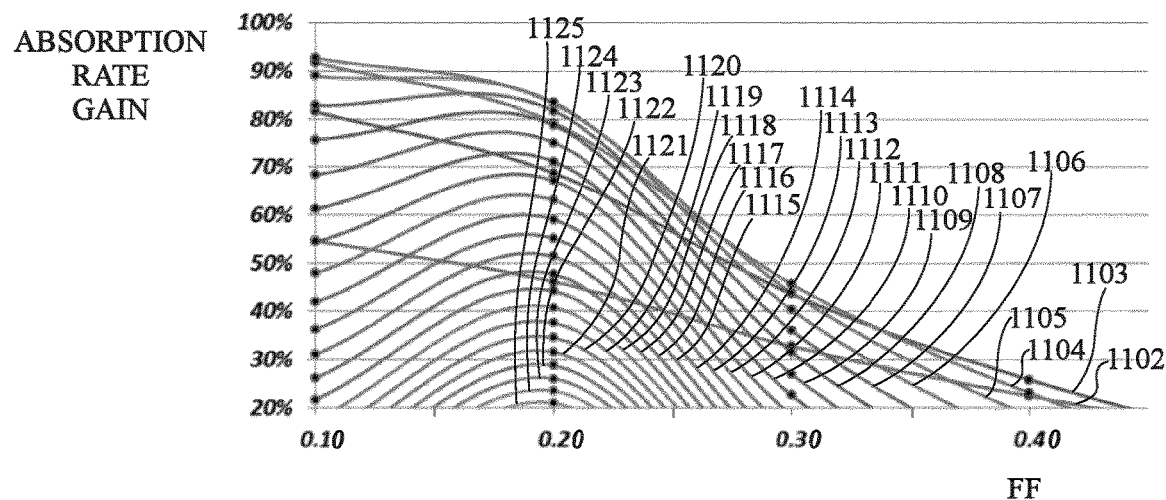
FIG. 12 is a graph showing in more detail a region of the graph of FIG. 11 corresponding to a gain of 20% or more.

FIG. 12 is a graph illustrating the curves 1102 to 1125 of FIG. 11 in more detail, and in particular the gains of 20% or more. It can be seen from FIG. 12 that gains of over 20% can be achieved when either:
- the pixel fill factor is equal to or greater than 0.30 and less than 0.40 and the sheet resistance is between 94 and 189 ohm/sq; or
- the pixel fill factor is equal to or greater than 0.20 and less than 0.30 and the sheet resistance is between 38 and 189 ohm/sq; or
- the pixel fill factor is equal to or greater than 0.10 and less than 0.25 and the sheet resistance is between 22 and 189 ohm/sq.

Figure 13:
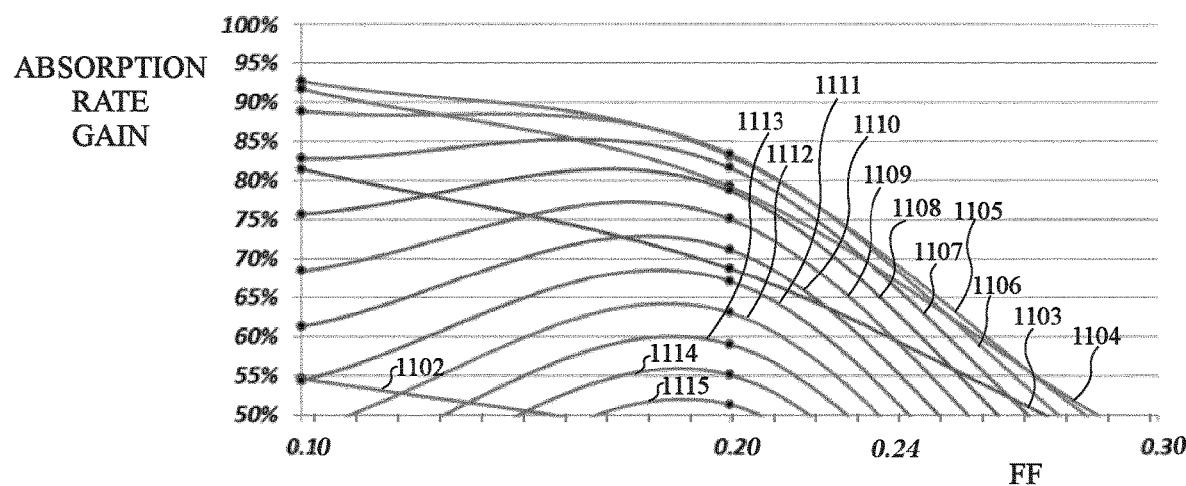
FIG. 13 is a graph representing in more detail a region of the graph of FIG. 11 corresponding to a gain of 50% or more.

FIG. 13 is a graph illustrating the curves 1102 to 1115 of FIG. 11 in more detail, and in particular the gains of 50% or more. It can be seen from FIG. 13 that gains of over 50% can be achieved when the pixel fill factor is equal to or greater than 0.10 and less than 0.24 and the sheet resistance is between 34 and 189 ohm/sq.

Figure 14:
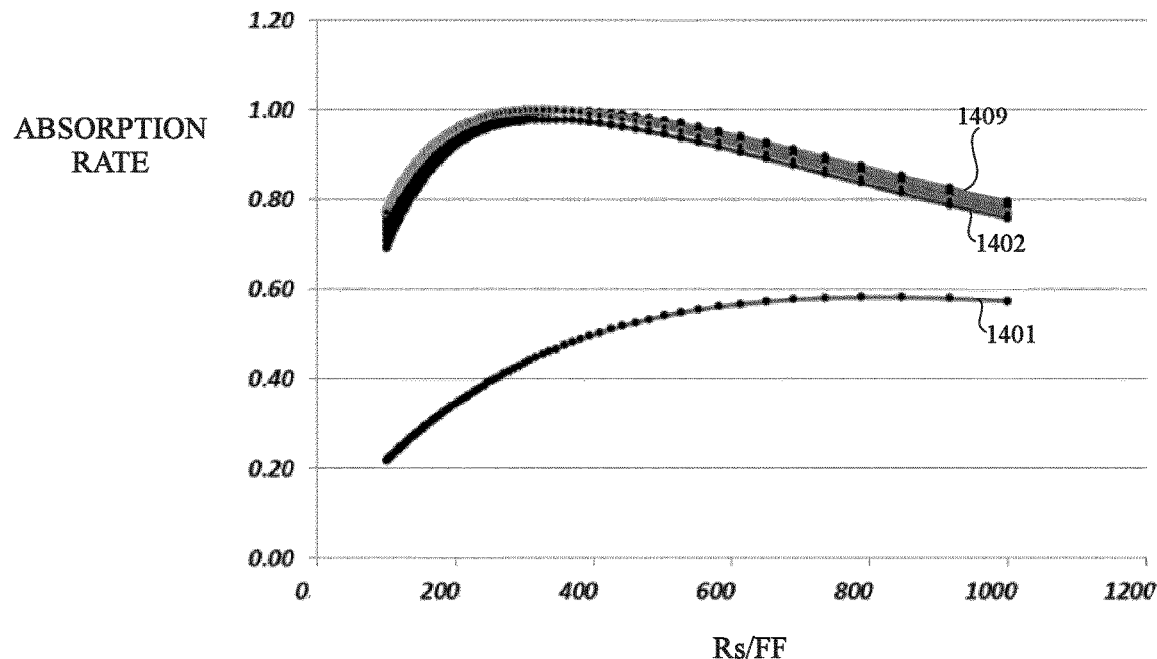
FIG. 14 is a graph representing an absorption rate of an absorption layer of a microbolometer pixel as a function of a ratio of sheet resistance/fill factor for different fill factors.

FIG. 14 is a graph representing the absorption rate as a function of a ratio of the sheet resistance (Rs) over fill factor (FF) for fill factors of 0.10 (curve 1401) and 0.20 to 0.90 (curves 1402 to 1409, of which only the curves 1402 and 1409 are labelled in FIG. 14). As with previous examples, the curves of FIG. 14 correspond to absorption layers formed of TiN with a pixel pitch of 8.5 μm, a quarter-wave cavity height of 2.5 μm and a light wavelength of 10 μm.

Figure 15:
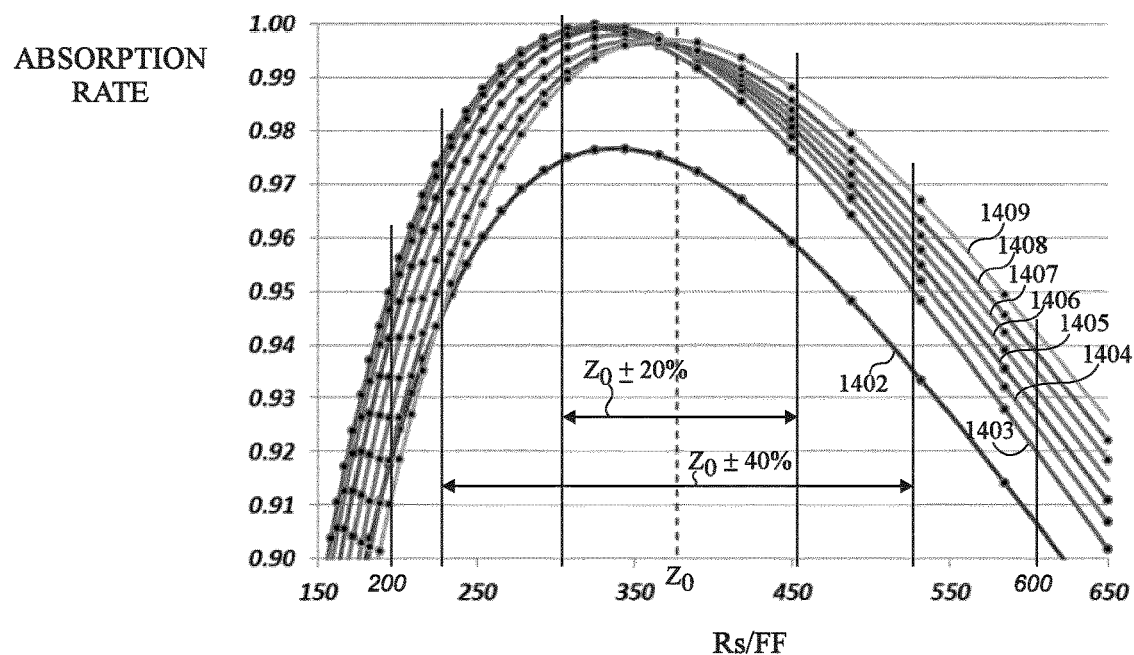
FIG. 15 is a graph showing in more detail a region of the graph of FIG. 14 corresponding to an absorption rate of over 0.9.

FIG. 15 illustrates the curves 1402 to 1409 of FIG. 14 in more detail, for absorption rates of 0.90 and over. It can be seen that absorption rates of over 0.90 can be achieved when the fill factor is between 0.10 and 0.50 and the ratio Rs/FF is in the range 200 to 600 ohm/sq. It can also be noted from FIG. 15 that the curves are substantially centered on the ratio of 377 ohm/sq, 377 ohms corresponding to the impedance of free space Z. Indeed, high absorption rates of over 0.93 can for example be observed when the ratio Rs/FF is equal to 377 plus or minus 40%, and even higher rates of over 0.95 can be observed when the ratio Rs/FF is equal to 377 plus or minus 20%.

The above examples are based on quarter-wave cavity heights of 2.5 μm. The principles described in relation with these examples could equally be applied to different quarter-wave cavity heights, for example for quart-wave cavity heights in the range 1.5 to 3.5 μm, as will now be explained with reference to FIGS. 16 and 17.

Figure 16:
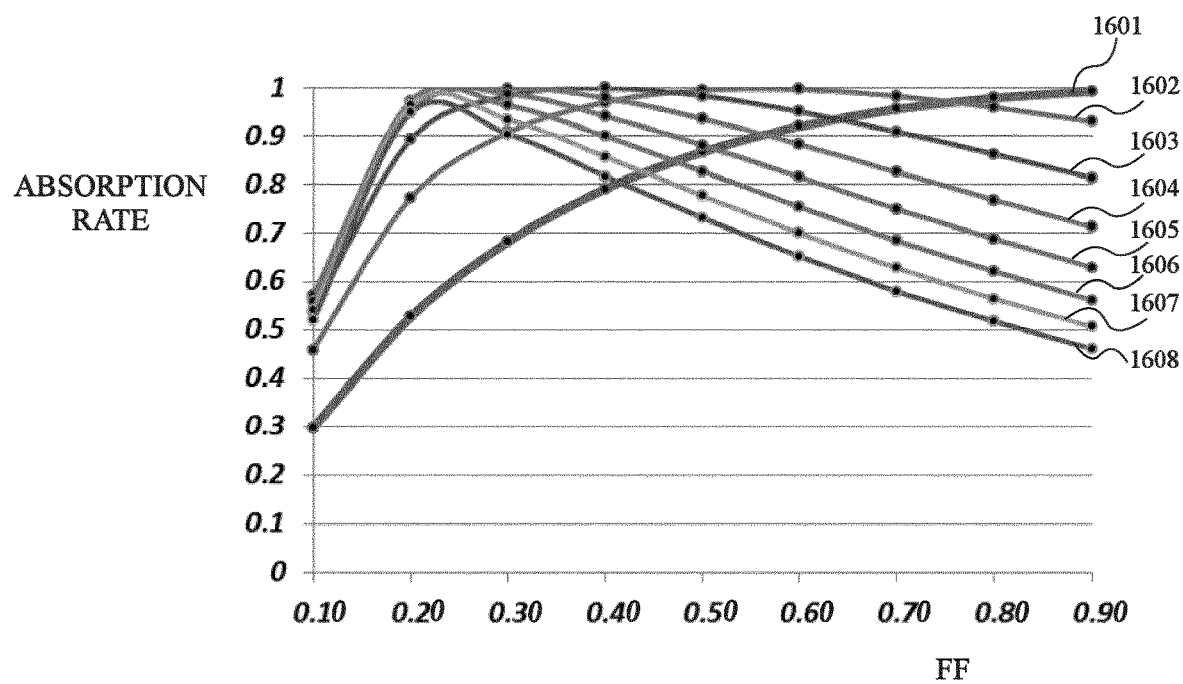
FIG. 16 is a graph showing an absorption rate of an absorption layer of a microbolometer pixel as a function of the pixel fill factor for eight different sheet resistances of the absorption layer in the case of a pixel pitch of 11 µm, a Fabry-Perot cavity height of 3.5 µm and for a light wavelength of 13 µm.

FIG. 16 is a graph representing the absorption rate (ABSORPTION RATE) as a function of the fill factor (FF) of a microbolometer pixel, such as the pixel 500 of FIG. 5, and having a pitch of 11 μm and a quarter-wave cavity height of 1.5 μm, for eight different sheet resistances of the absorption layer 530 and for a light wavelength of 13 μm. The absorption layer 530 is assumed to be formed of TiN, and the sheet resistances of the absorption layer 530, corresponding to the curves 1601 to 1608 of FIG. 16, are the same as those of the curves 401 to 408 of Table 1 respectively.

It can be seen from FIG. 16 that the results are similar to those of FIG. 7.

Figure 17:
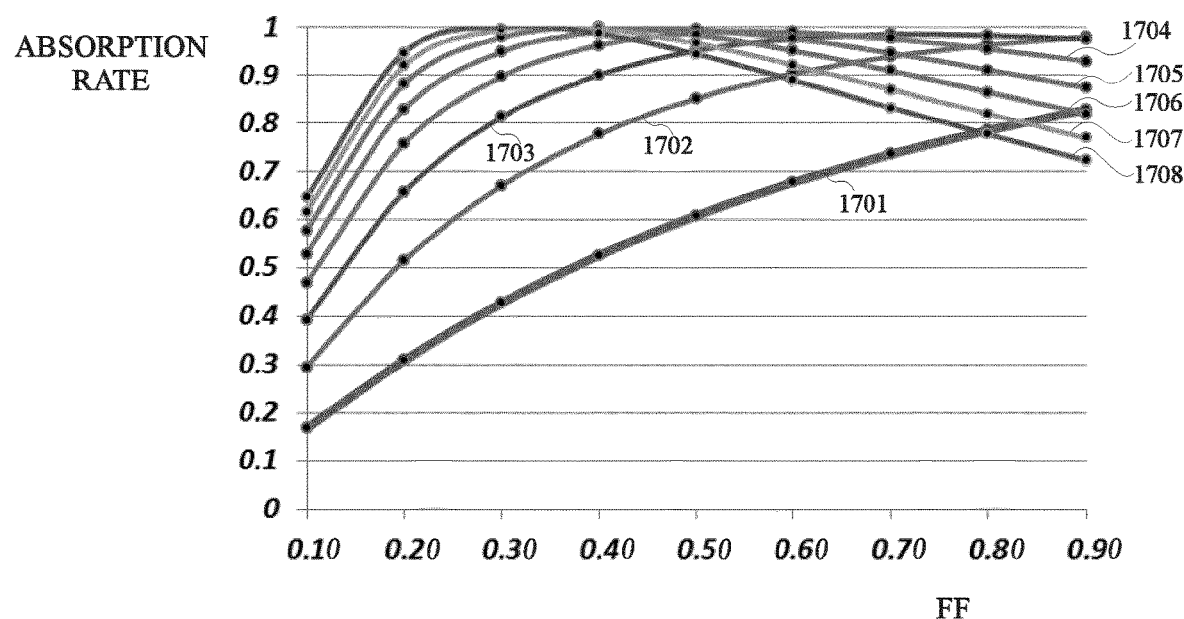
FIG. 17 is a graph showing an absorption rate of an absorption layer of a microbolometer pixel as a function of the pixel fill factor for eight different sheet resistances of the absorption layer in the case of a pixel pitch of 5 µm, a Fabry-Perot cavity height of 1.5 µm and for a light wavelength of 6 µm.

FIG. 17 is a graph representing the absorption rate (ABSORPTION RATE) as a function of the fill factor (FF) of a microbolometer pixel, such as the pixel 500 of FIG. 5, and having a pitch of 5 μm and a quarter-wave cavity height of 1.5 μm, for eight different sheet resistances of the absorption layer 530 and for a light wavelength of 6 μm. The absorption layer 530 is assumed to be formed of TiN, and the sheet resistances of the absorption layer 530, corresponding to the curves 1701 to 1708 of FIG. 17, are the same as those of the curves 401 to 408 of Table 1 respectively.

It can be seen from FIG. 17 that the gain demonstrated by the curves 1702 to 1708 with respect to the curve 1701 is more pronounced for fill factors in the range 0.10 to 0.50, but the best results are obtained when the sheet resistance is of less than 75 ohm/sq.

More generally, the principles described herein are for example applicable for any pixel pitch in the range 5 to 11 μm, where the quarter-wave cavity height is for example equal to λtg/4, where λtg is the light wavelength of interest (target wavelength), and the pitch is less than λtg. Thus, in the case of a quarter-wave cavity height of 1.5 μm, the pixel pitch is for example less than 6 μm, and in the case of a quarter-wave cavity height of 3.5 μm, the pixel pitch is for example anywhere in the range 5 to 11 μm.

The results of FIGS. 7 and 10 to 13 are based on pixels having a pitch of 8.5 μm. The principles described in relation with these examples could be applied to pixels having a pitch anywhere in the range 5 to 11 μm, as will now be described in more detail with reference to FIGS. 18 to 25.

FIGS. 18 to 25 are graphs representing the absorption rate (ABSORPTION RATE) as a function of the fill factor (FF) of a microbolometer pixel, such as the pixel 500 of FIG. 5, having a quarter-wave cavity height of 2.5 μm and for a light wavelength of 10 μm, for eight different sheet resistances of the absorption layer 530. The absorption layer 530 is assumed to be formed of TiN, and the sheet resistances of the absorption layer 530, corresponding to the curves i01 to i08 of FIGS. 18 to 25 (for i from 18 to 25), are the same as those of the curves 401 to 408 of Table 1 respectively.

Figure 18:
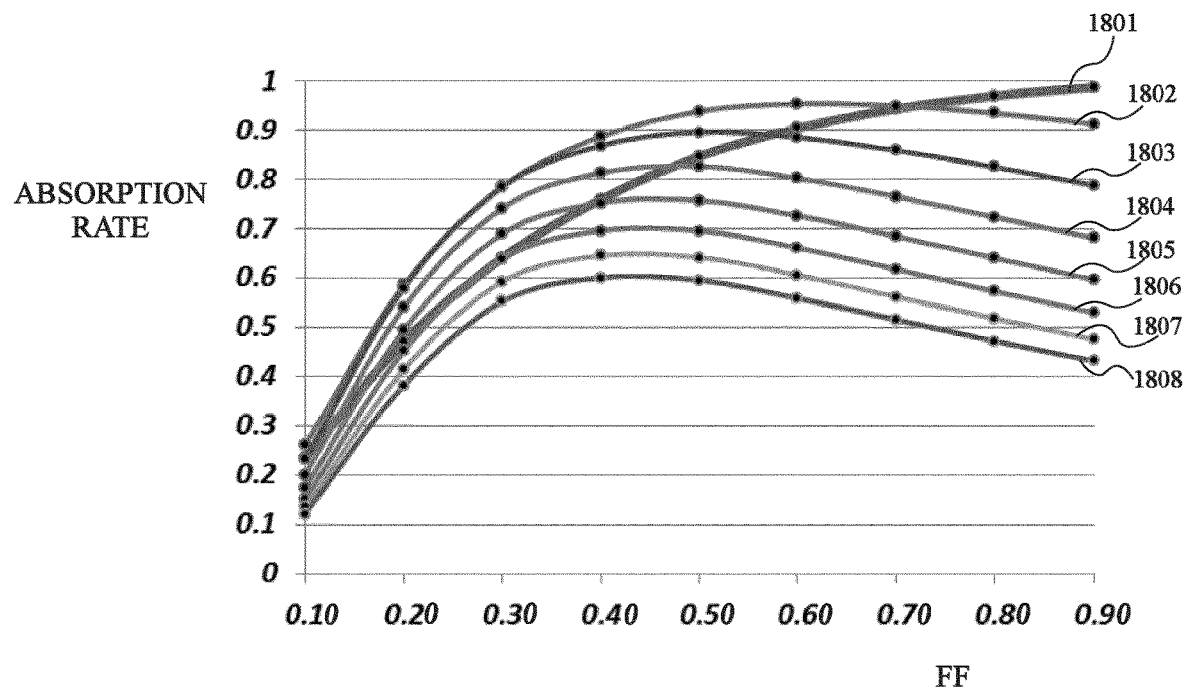
FIG. 18 is a graph showing an absorption rate of an absorption layer of a microbolometer pixel as a function of the pixel fill factor for eight different sheet resistances of the absorption layer in the case of a pixel pitch of 5 µm, a Fabry-Perot cavity height of 2.5 µm and a light wavelength of 10 µm.
Figure 19:
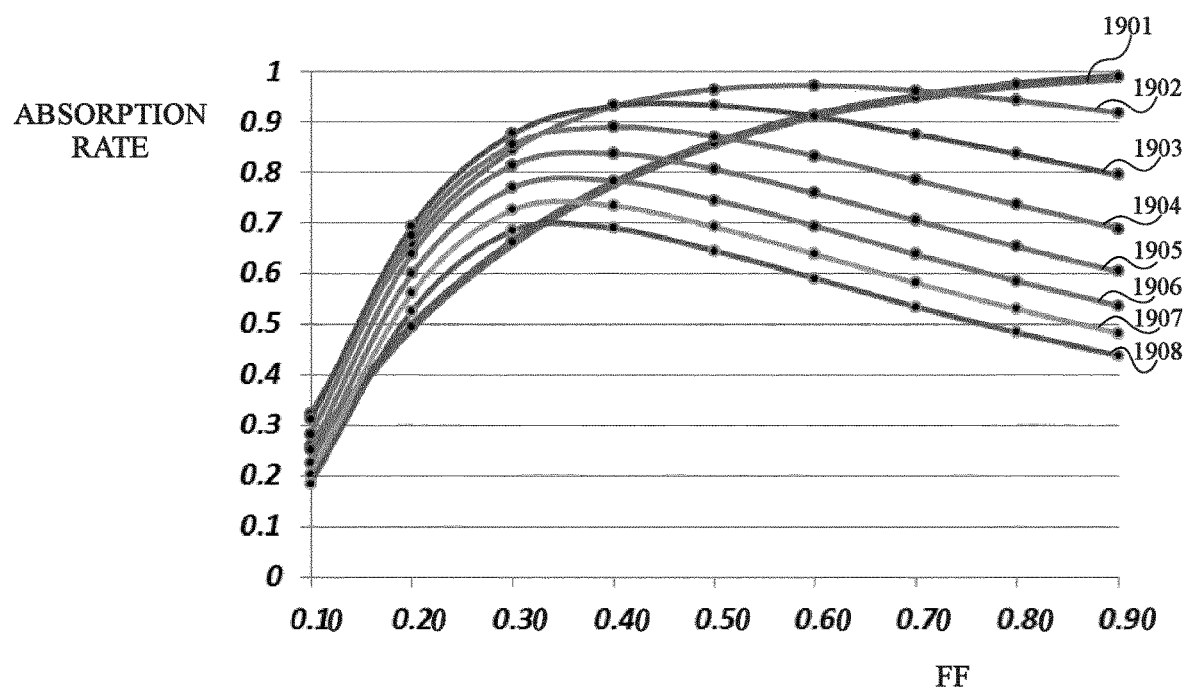
FIG. 19 is a graph showing an absorption rate of an absorption layer of a microbolometer pixel as a function of the pixel fill factor for eight different sheet resistances of the absorption layer in the case of a pixel pitch of 6 µm, a Fabry-Perot cavity height of 2.5 µm and a light wavelength of 10 µm.
Figure 20:
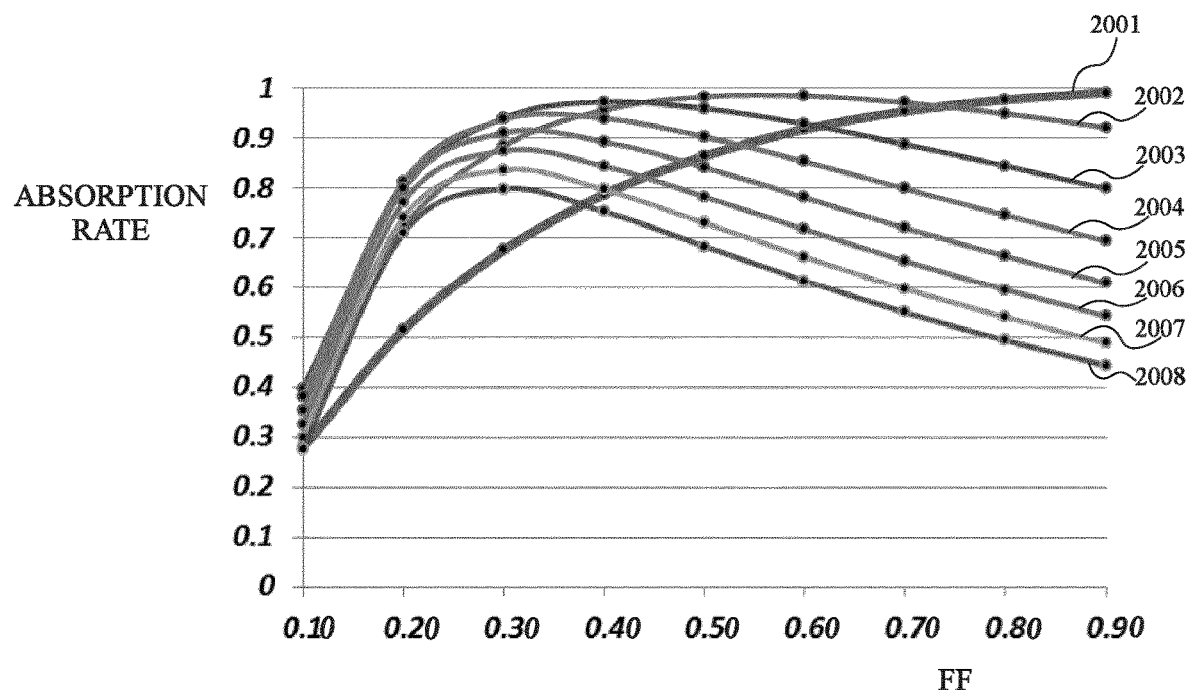
FIG. 20 is a graph showing an absorption rate of an absorption layer of a microbolometer pixel as a function of the pixel fill factor for eight different sheet resistances of the absorption layer in the case of a pixel pitch of 7 µm, a Fabry-Perot cavity height of 2.5 µm and a light wavelength of 10 µm.
Figure 21:
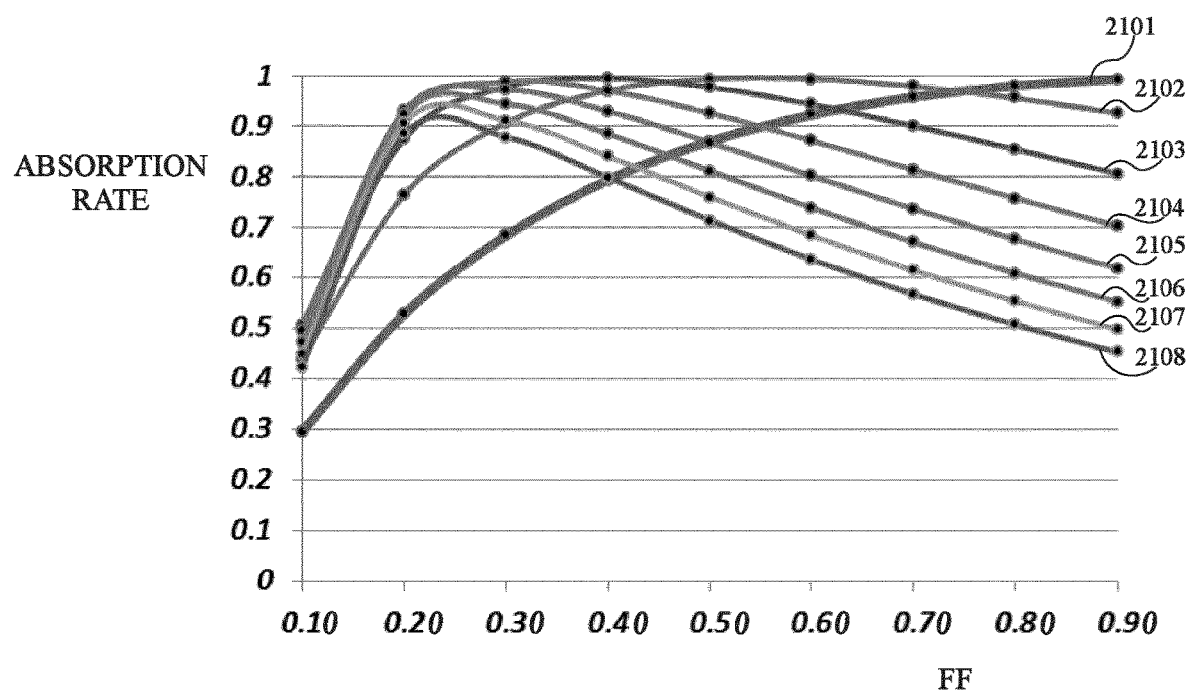
FIG. 21 is a graph showing an absorption rate of an absorption layer of a microbolometer pixel as a function of the pixel fill factor for eight different sheet resistances of the absorption layer in the case of a pixel pitch of 8 µm, a Fabry-Perot cavity height of 2.5 µm and a light wavelength of 10 µm.
Figure 22:
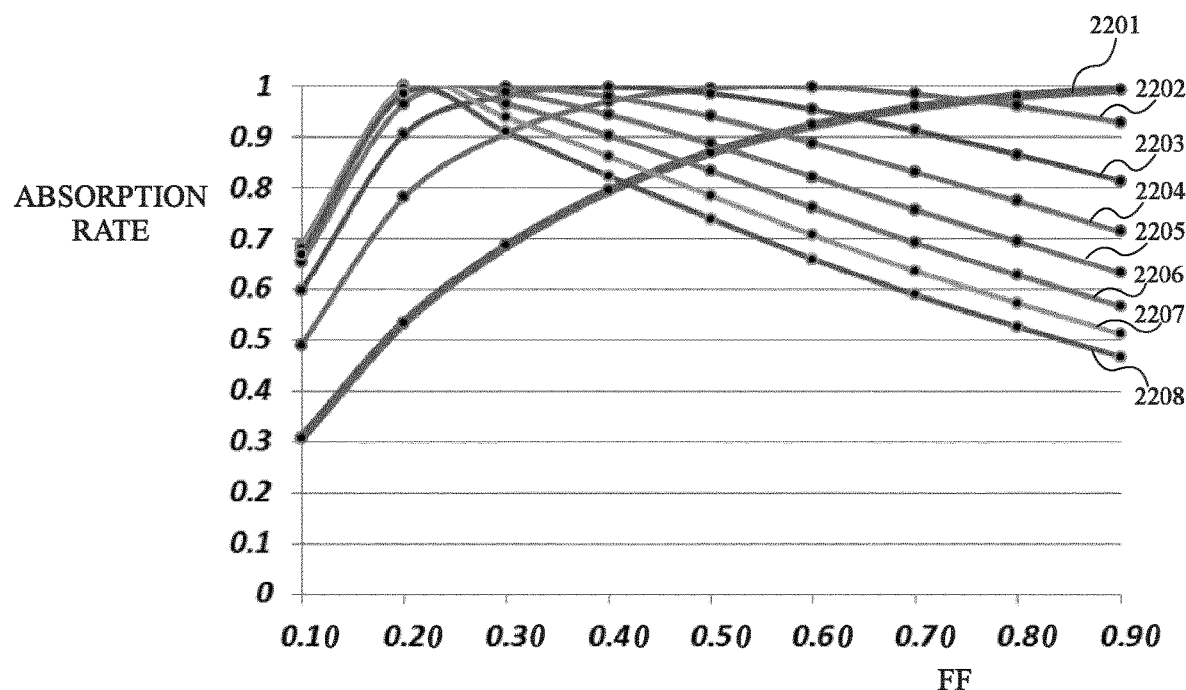
FIG. 22 is a graph showing an absorption rate of an absorption layer of a microbolometer pixel as a function of the pixel fill factor for eight different thicknesses of the absorption layer in the case of a pixel pitch of 9 µm, a Fabry-Perot cavity height of 2.5 µm and a light wavelength of 10 µm.
Figure 23:
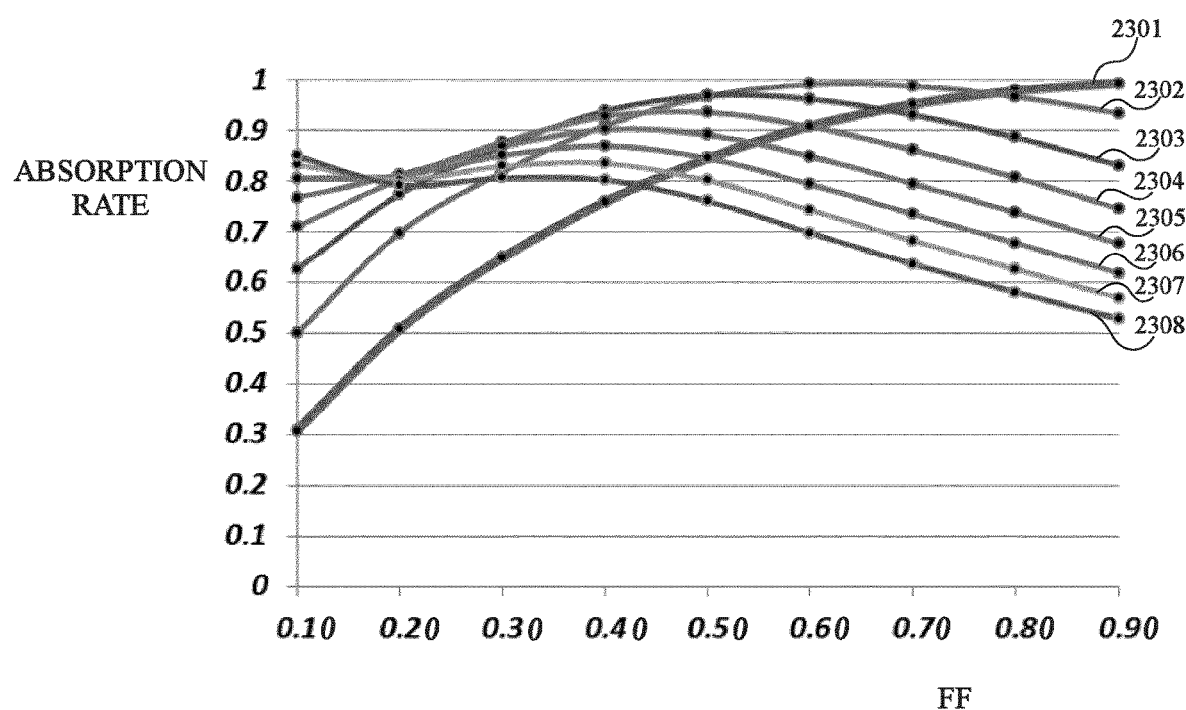
FIG. 23 is a graph showing an absorption rate of an absorption layer of a microbolometer pixel as a function of the pixel fill factor for eight different sheet resistances of the absorption layer in the case of a pixel pitch of 10 µm, a Fabry-Perot cavity height of 2.5 µm and a light wavelength of 10 µm.
Figure 24:
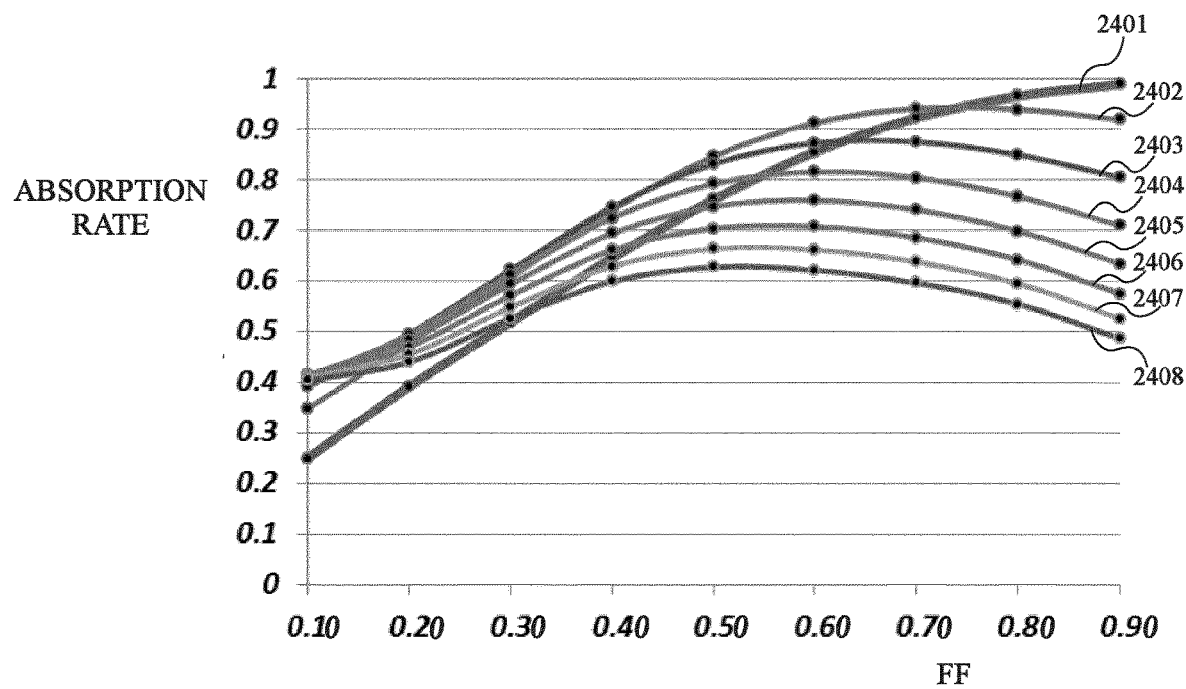
FIG. 24 is a graph showing an absorption rate of an absorption layer of a microbolometer pixel as a function of the pixel fill factor for eight different sheet resistances of the absorption layer in the case of a pixel pitch of 11 µm, a Fabry-Perot cavity height of 2.5 µm and a light wavelength of 10 µm.
Figure 25:
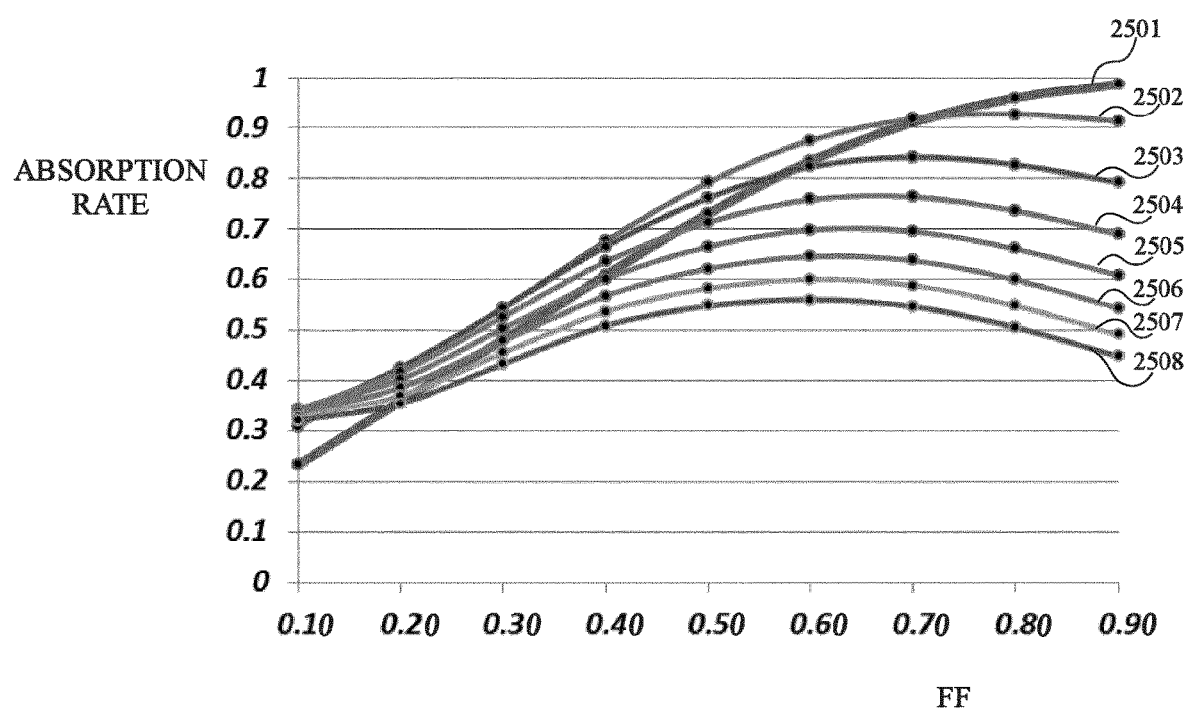
FIG. 25 is a graph showing an absorption rate of an absorption layer of a microbolometer pixel as a function of the pixel fill factor for eight different sheet resistances of the absorption layer in the case of a pixel pitch of 12 µm, a Fabry-Perot cavity height of 2.5 µm and a light wavelength of 10 µm.

FIG. 18 illustrates an example of a pixel pitch of 5 μm, FIG. 19 an example of a pixel pitch of 6 μm, FIG. 20 an example of a pixel pitch of 7 μm, FIG. 21 an example of a pixel pitch of 8 μm, FIG. 22 an example of a pixel pitch of 9 μm, FIG. 23 an example of a pixel pitch of 10 μm, FIG. 24 an example of a pixel pitch of 11 μm and FIG. 25 an example of a pixel pitch of 12 μm.

As shown by FIGS. 18 to 22, for pixel pitches from 5 to 6 μm and fill factors from 0.10 to 0.40, the best results are obtained when the sheet resistance is between 94 and 189 ohm/sq, for pixel pitches from 6 to 7 μm and fill factors from 0.10 to 0.50, the best results are obtained when the sheet resistance is between 94 and 189 ohm/sq, and for pixel pitches from 7 to 9 μm and fill factors from 0.10 to 0.50, the best results are obtained when the sheet resistance is between 75 and 189 ohm/sq.

As shown by FIGS. 22 to 25, for pixel pitches from 9 to 10 μm and fill factors from 0.10 to 0.50, the best results are obtained when the sheet resistance is between 75 and 189 ohm/sq, and for pixel pitches from 10 to less than 12 μm and fill factors from 0.10 to 0.50, the best results are obtained when the sheet resistance is between 94 and 189 ohm/sq.

Second Aspect

A further difficulty in microbolometers is to filter out wavelengths of light outside the target range. In some embodiments, surface processing and/or coatings can be applied to one or more optical elements between the microbolometer array and the image scene in order to filter the received light. However, such techniques add to the cost.

The present inventor has found that a certain choice of pixel pitch, or of detection cell pitch, can lead to a filtering function, as will now be described with reference to FIGS. 26A and 27.

Figure 26A:
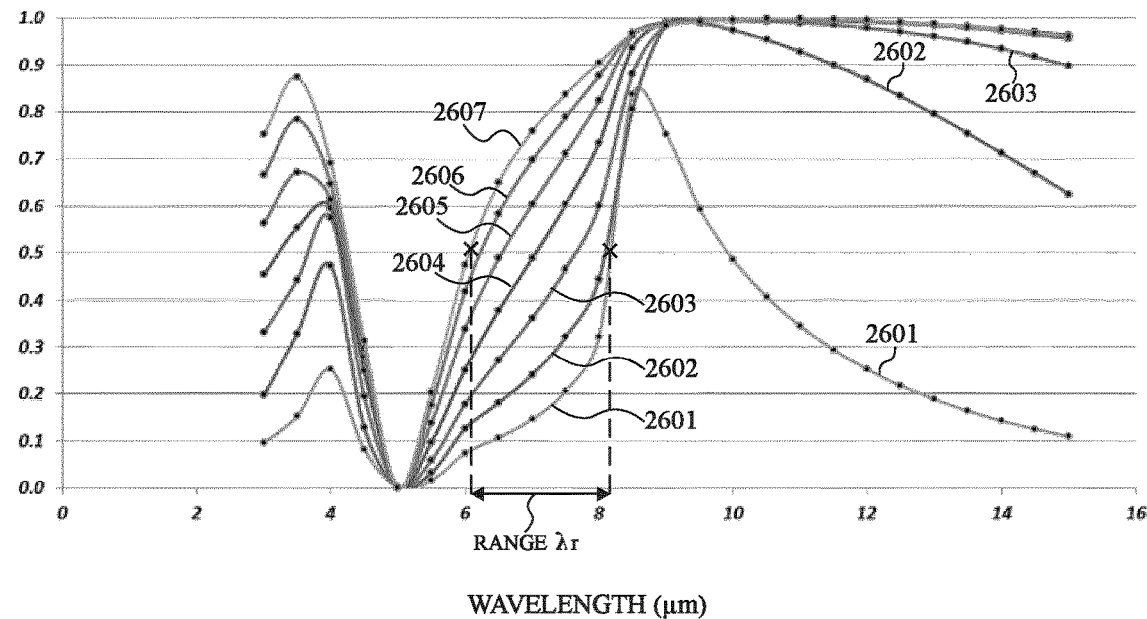
FIG. 26A is a graph showing an absorption rate of an absorption layer of a microbolometer pixel as a function of the light wavelength, for seven different pixel fill factors, for a pixel pitch of 8.5 µm and for a Fabry-Perot cavity height of 2.5 µm.

FIG. 26A is a graph showing an absorption rate as a function of the light wavelength, for a pixel pitch/detection cell pitch of 8.5 μm, and for seven different pixel fill factors of a microbolometer pixel such as the pixel 500 of FIG. 5. For each fill factor, a thickness of the absorption layer is chosen that renders the ratio Rs/FF substantially equal to 377 ohm/square. In particular, the curves 2601 to 2607 in FIG. 26A are based on absorption layers formed of TiN having fill factors and sheet resistances as defined in the following table.

TABLE 3

| Curve Reference | Fill Factor | TiN Thickness (nm) | Sheet Resistance (ohm/sq) |
| --- | --- | --- | --- |
| 2601 | 0.10 | 50 | 38 |
| 2602 | 0.20 | 25 | 75 |
| 2603 | 0.30 | 17 | 111 |
| 2604 | 0.40 | 13 | 145 |
| 2605 | 0.50 | 10 | 189 |
| 2606 | 0.60 | 8 | 234 |
| 2607 | 0.70 | 7 | 269 |

It can be seen from FIG. 26A that a filtering function is obtained having a cut-off frequency $\lambda r$, defined as an absorption rate of less than 0.5, at a wavelength in a range (RANGE $\lambda r$) of around 6 to 8 μm, depending on the fill factor. The present inventor has found that this filtering function is a result of diffraction that occurs when the pixel or detection cell pitch in either or both of the x and y directions approaches the lower cut-off wavelength defined by the quarter-wave cavity of each pixel. In the example of FIG. 26A, the quarter-wave cavity has a height h of 2.5 μm, leading to a lower cut-off wavelength $\lambda c$ of around 6 μm. More generally, the lower cut-off wavelength $\lambda c$ defined by the quarter-wave cavity is equal to around $0.6\lambda 0$, where $\lambda 0$ is equal to the targeted wavelength equal to four times the height h of the quarter-wave cavity.

It will be noted that, below the trough at around 6 μm, the absorption rate rises again to peak for a wavelength at around 4 μm. However, these lower wavelengths are for example removed by relatively inexpensive surface treatments or filtering layers applied to optical elements between the microbolometer array and the image scene.

More generally, the height h of the quarter-wave cavity of each pixel (see for example FIGS. 2 and 5) is in the range 0.5 to 5 μm, leading to a targeted light wavelength of between 2 and 20 μm. However, the filtering performance is particularly apparent for quarter-wave cavities of at least 1.5 μm, corresponding to a targeted light wavelength of at least 6 μm.

A quarter-wave cavity of 1.5 μm in height leads to a lower cut-off wavelength $\lambda c$ of around 3.6 μm and a quarter-wave cavity of 5 μm in height leads to a lower cut-off wavelength $\lambda c$ of around 12 μm. In some embodiments, the height h of the quarter-wave cavity of each pixel is in the range 1.5 to 3.5 μm.

For example, in order to obtain a filtering function, the detection cell pitch is chosen to be in the range $0.9\lambda c$ to $1.65\lambda c$, corresponding to the range $[1.2\lambda 0/2\text{-}1.8\lambda 0/2]$ plus or minus 10% and preferably from $\lambda c$ to $1.5\lambda c$. Indeed, this corresponds to the range within which the quarter-wave cut-off frequency effect operates. The filtering performance is particularly apparent when the detection cell pitch is chosen to be in the range 2.4 h to 3.6 h, where h is the quarter-wave cavity height, and thus for a quarter-wave cavity height of 2.5 μm, the pixel pitch is in the range 6 to 9 μm. In some embodiments, according to the second aspect, the pitch of the detection cell is between 3.6 μm and 18 μm, and for example between 4 μm and 15 μm, and preferably between 5 and 11 μm.

It can be seen from FIG. 26A that the rejection, and thus the filtering, is enhanced as the fill factor decreases and the thickness of the absorption layer increases. In some embodiments, the absorption layer is formed of metal and has a sheet resistance Rs of less than 189 ohm/sq.

In some embodiments, the fill factor and sheet resistance of the absorption layer are chosen based on the same criteria as described above in relation with the first aspect. For example, the absorption layer has a pixel fill factor FF in a range 0.10 to 0.50 and a sheet resistance Rs in the range 16 to 189 ohm/sq. Furthermore, to obtain relatively high gains in absorption, the absorption layer is for example chosen such that:

the pixel fill factor is equal to or greater than 0.40 and less than 0.50 and the sheet resistance is between 75 and 189 ohm/sq; or the pixel fill factor is equal to or greater than 0.30 and less than 0.40 and the sheet resistance is between 47 and 189 ohm/sq; or the pixel fill factor is equal to or greater than 0.20 and less than 0.30 and the sheet resistance is between 25 and 189 ohm/sq; or the pixel fill factor is equal to or greater than 0.10 and less than 0.20 and the sheet resistance is between 16 and 189 ohm/sq.

Furthermore, in some embodiments, a ratio Rs/FF is in the range 200 to 600 ohm/sq, or to 377 plus or minus 40% or even to 377 plus or minus 20%.

Figure 27:
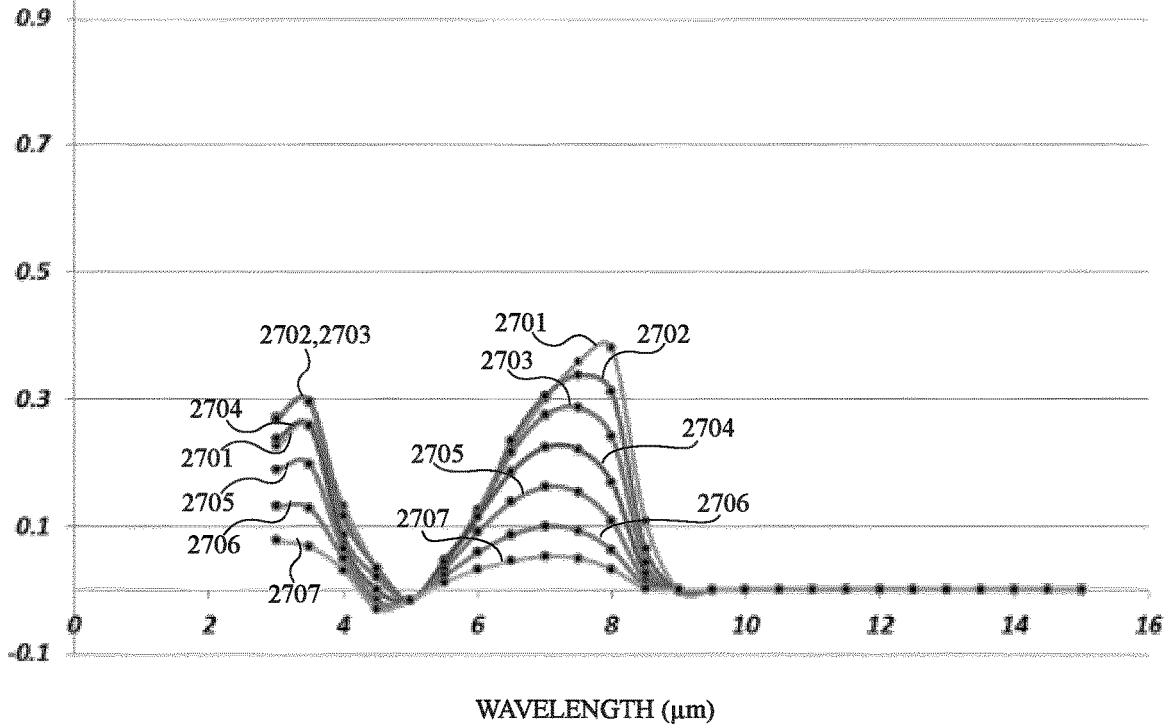
FIG. 27 is a graph showing a rate of non-absorbed diffracted power as a function of the light wavelength and for seven different pixel fill factors and for a pixel pitch of 8.5 µm and for a Fabry-Perot cavity height of 2.5 µm.

FIG. 27 is a graph showing a rate of non-absorbed diffracted power as a function of the light wavelength. The seven curves 2701 to 2707 of FIG. 27 correspond to the same absorption layers as the curves 2601 to 2607 respectively of FIG. 26A. The non-absorbed diffracted power is calculated as the input power, minus the absorbed power, minus the reflected power.

While the graph of FIG. 27 shows some artifacts, such as negative power at around the wavelength of 5 μm, the graph is still representative of the general behavior of the absorption layer. The graph of FIG. 27 confirms in particular that power is filtered out in the wavelengths 6 to 8 μm, i.e. at around the lower cutoff wavelength $\lambda c$, equal to around 7 μm, of the quarter-wave cavity.

Furthermore, the graph of FIG. 27 confirms that, as the fill factor is reduced and the thickness of the absorption layer increased, the filtering effect is enhanced.

FIGS. 26B to 26G are graphs showing an absorption rate of an absorption layer of a microbolometer pixel as a function of the light wavelength, for the same seven different pixel fill factors and absorption layer thicknesses as in FIG. 26A, the corresponding curves being labelled with the same references as in FIG. 26A.

Figure 26B:
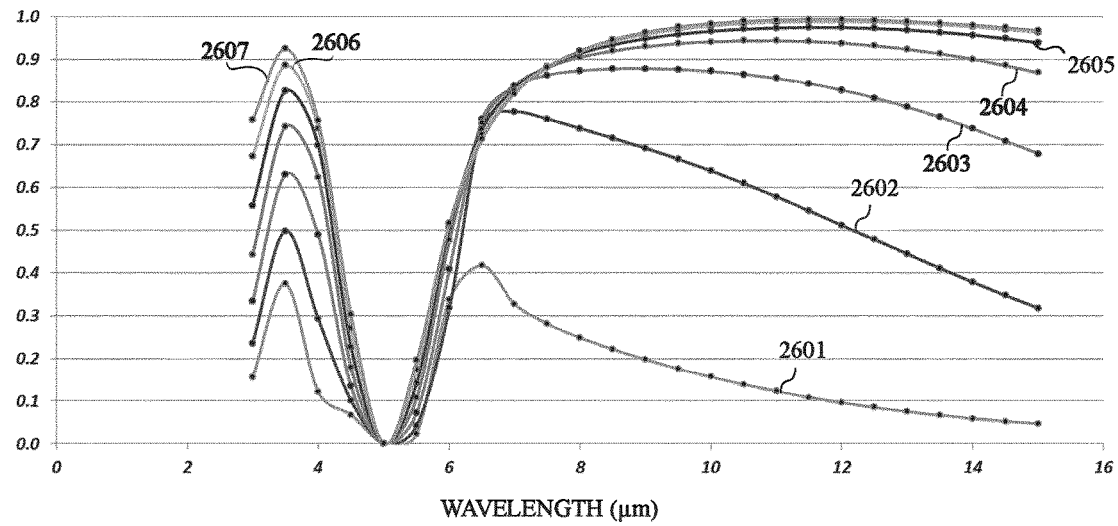
FIGS. 26B to 26G are graphs showing an absorption rate of an absorption layer of a microbolometer pixel as a function of the light wavelength, for seven different pixel fill factors, FIGS. 26B and 26C corresponding to a Fabry-Perot cavity height of 2.5 µm and pixel pitches of 6 µm and 9 µm respectively.
Figure 26C:
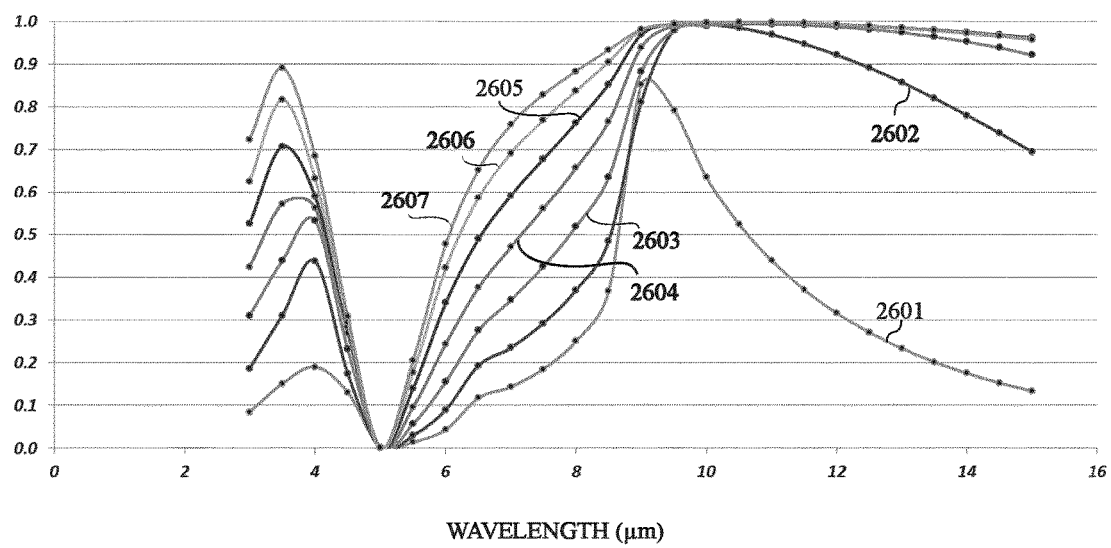

FIGS. 26B and 26C correspond to a Fabry-Perot cavity height of 2.5 μm and pixel pitches of 6 μm and 9 μm respectively.

Figure 26D:
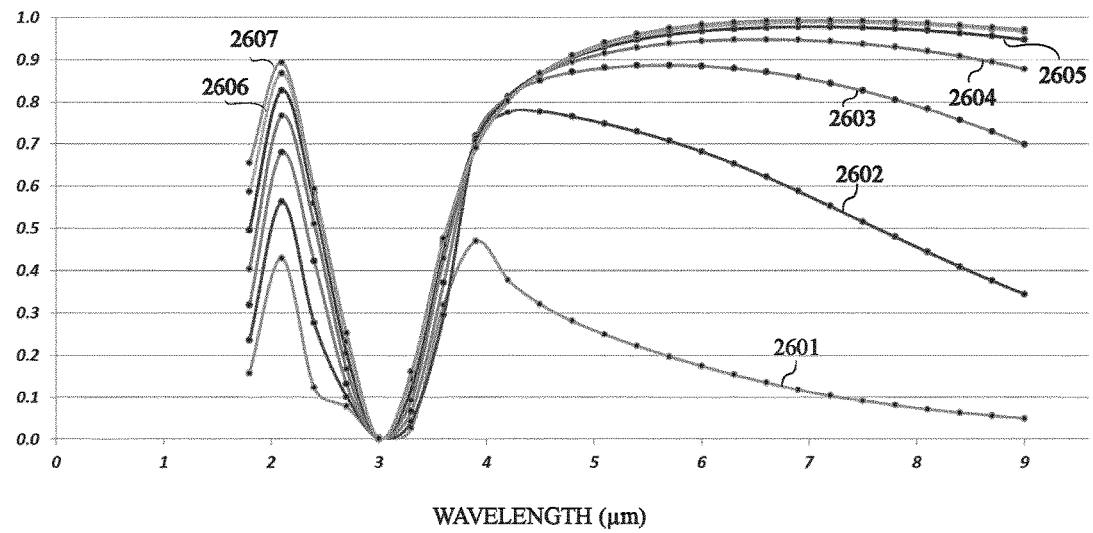
Figure 26E:
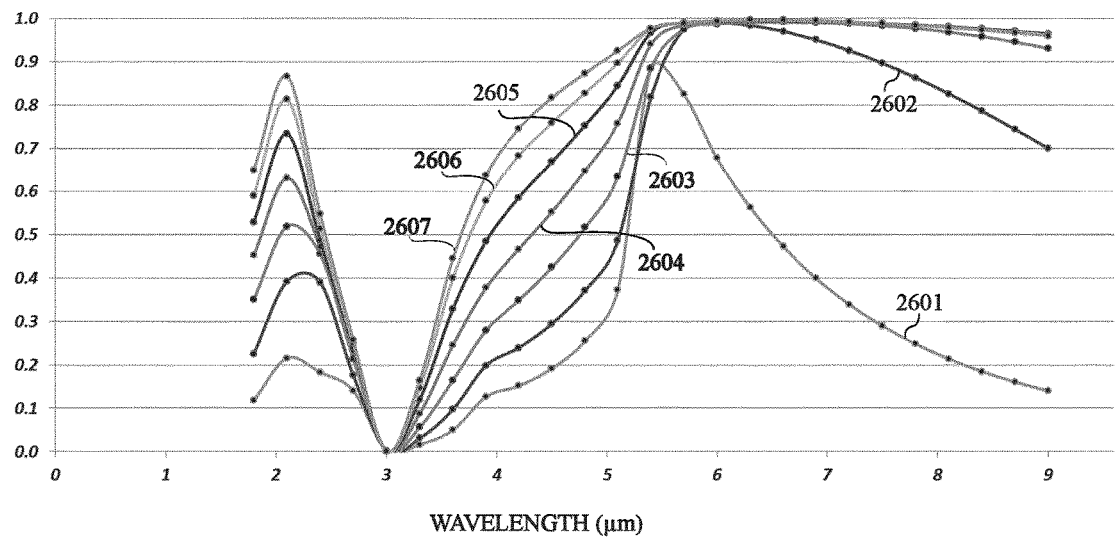

FIGS. 26D and 26E correspond to a Fabry-Perot cavity height of 1.5 μm and pixel pitches of 3.6 μm and 5.4 μm respectively.

Figure 26F:
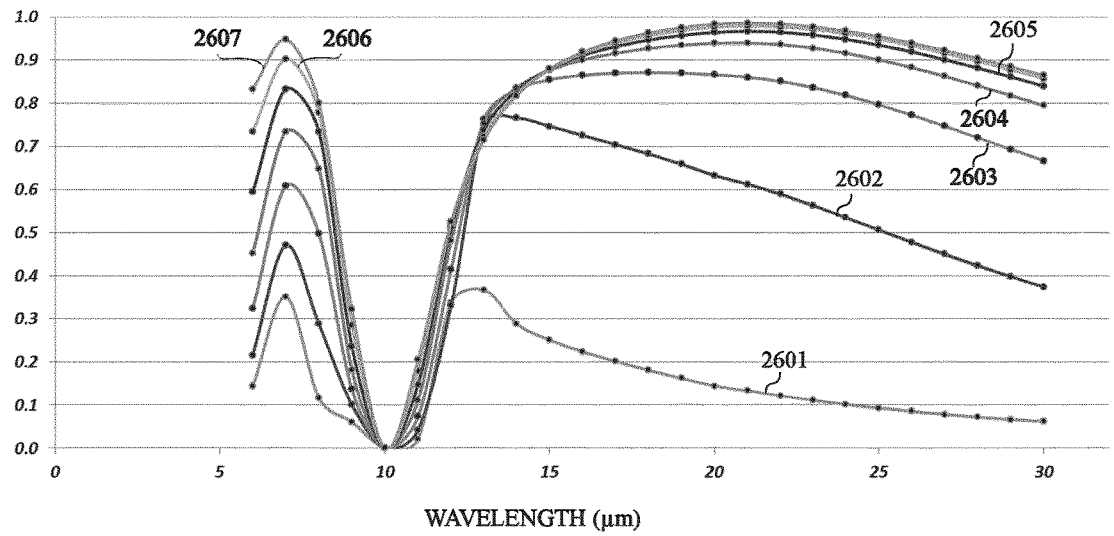
Figure 26G:
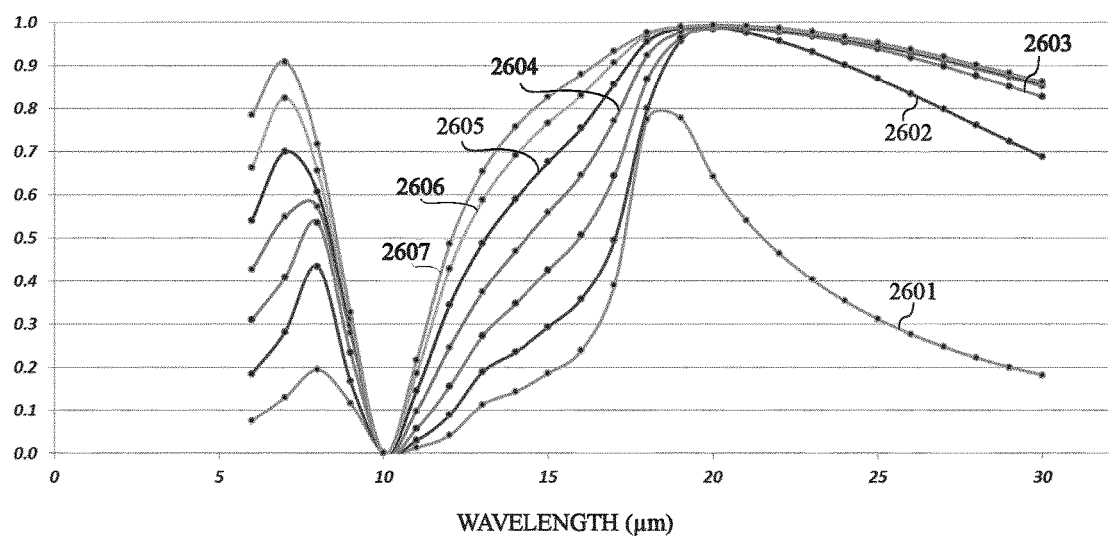
Figure 26H:
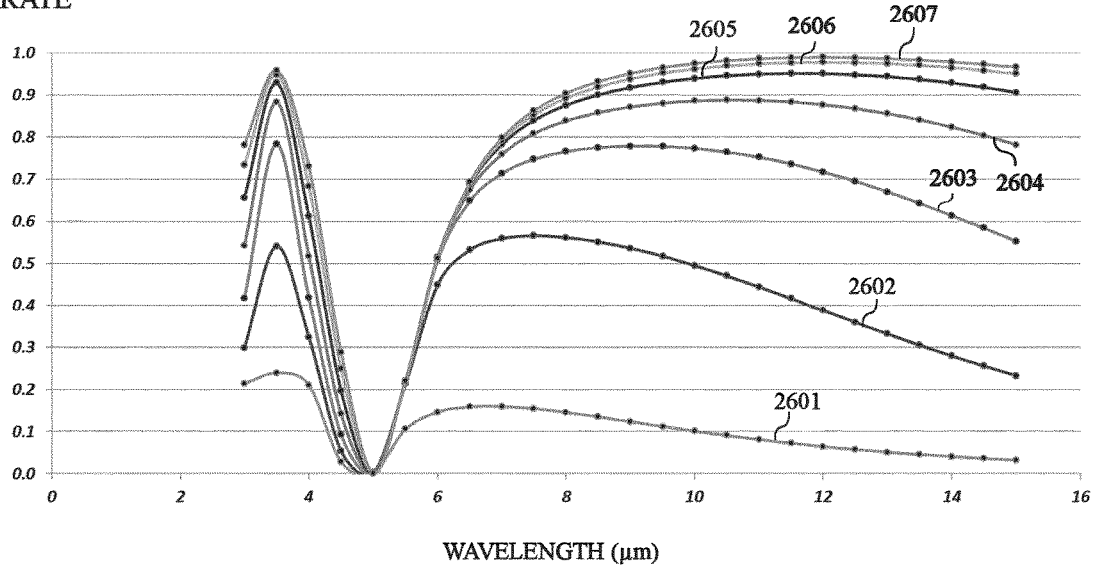
FIGS. 26H to 26R are graphs showing an absorption rate, of an absorption layer of a microbolometer pixel having a Fabry-Perot cavity height of 2.5 µm, as a function of the light wavelength, for seven different pixel fill factors, the figures respectively showing examples with pixel pitches of 5 µm, 5.5 µm, 6 µm, 6.5 µm, 7 µm, 7.5 µm, 8 µm, 8.5 µm, 9 µm, 9.5 µm and 10 µm.
Figure 26I:
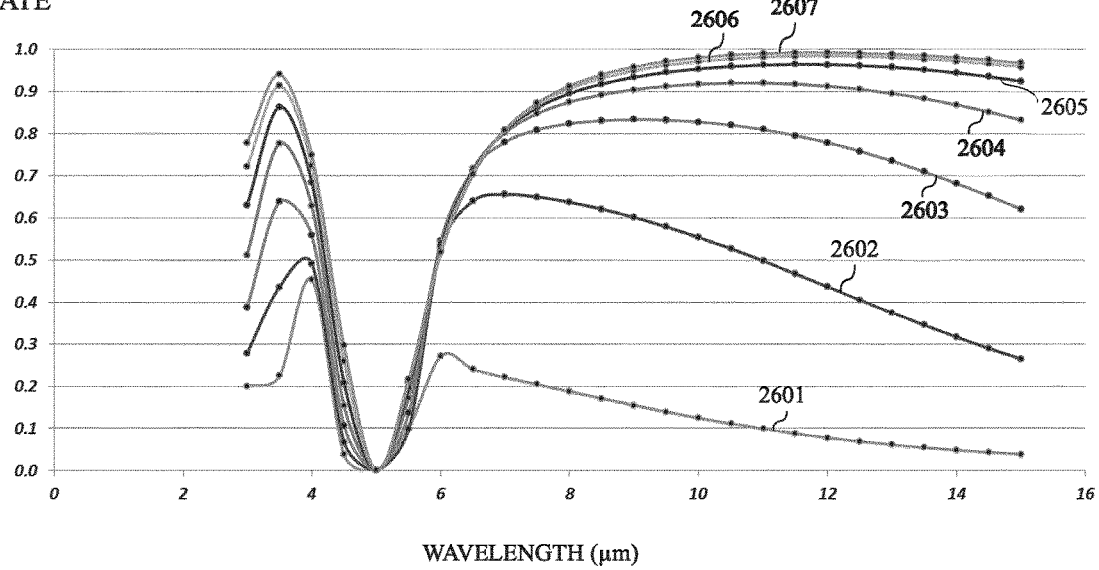
Figure 26J:
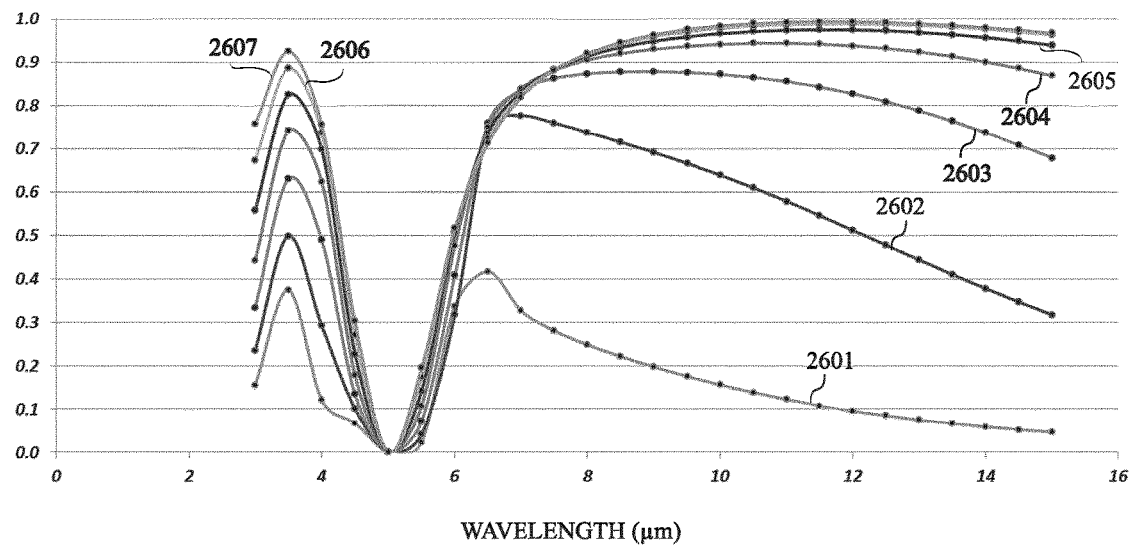
Figure 26K:
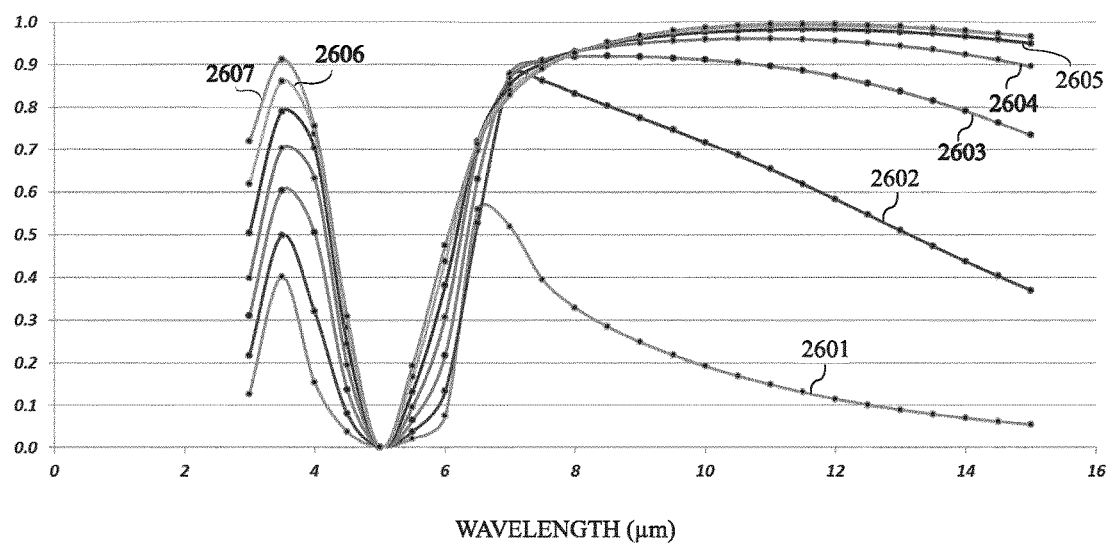
Figure 26L:
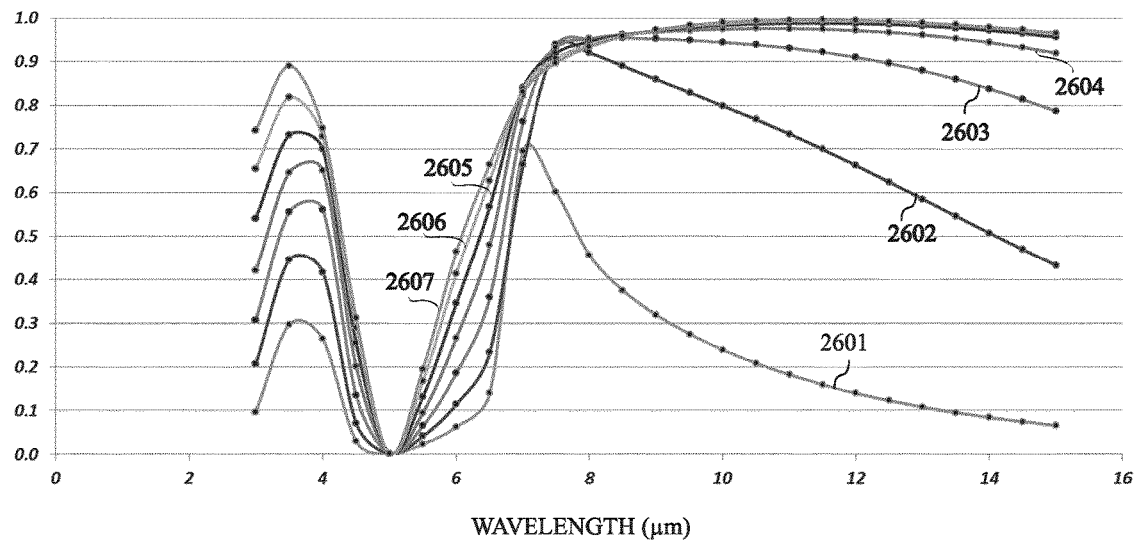
Figure 26M:
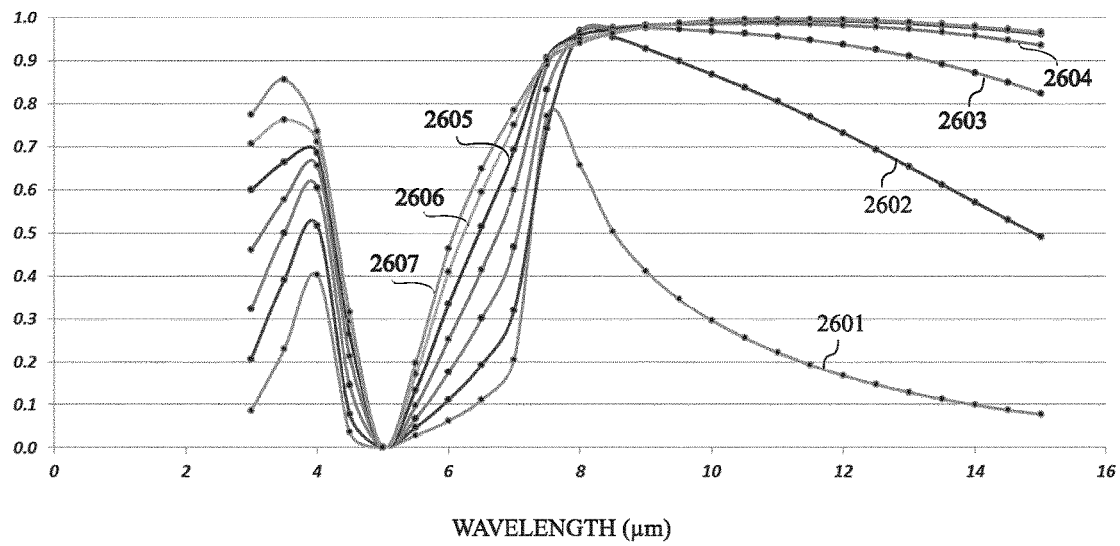
Figure 26N:
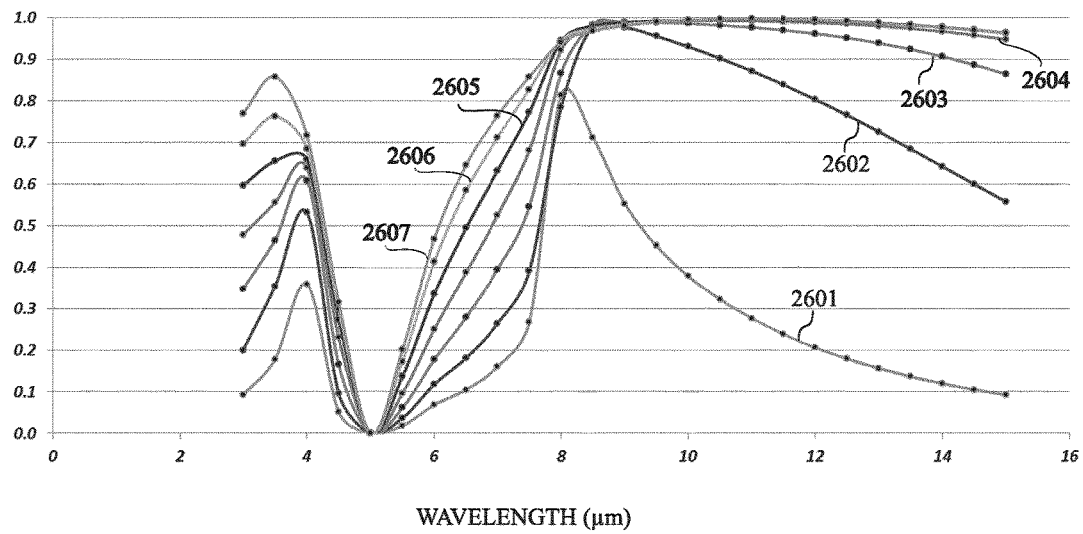
Figure 26O:
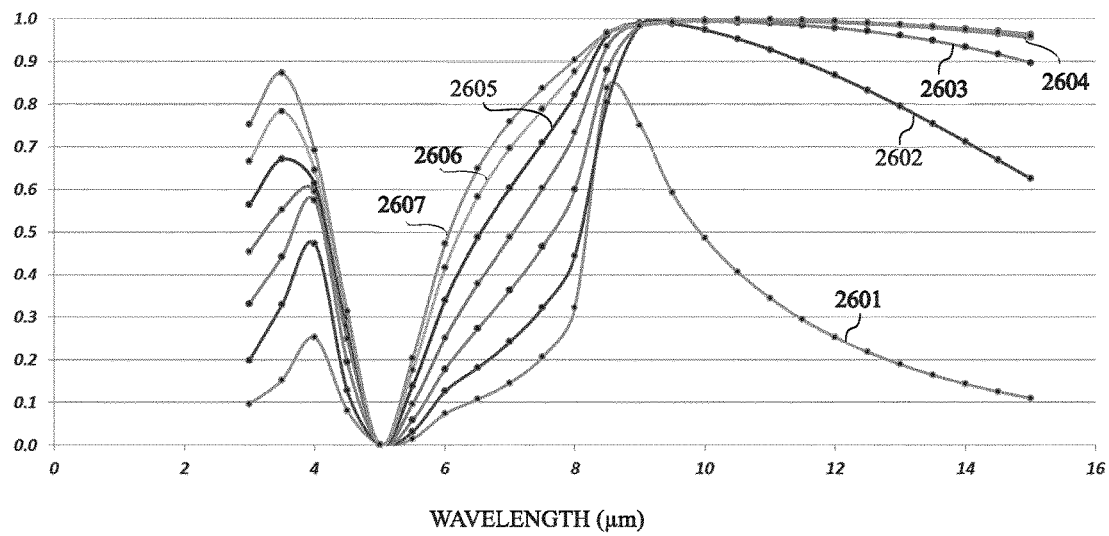
Figure 26P:
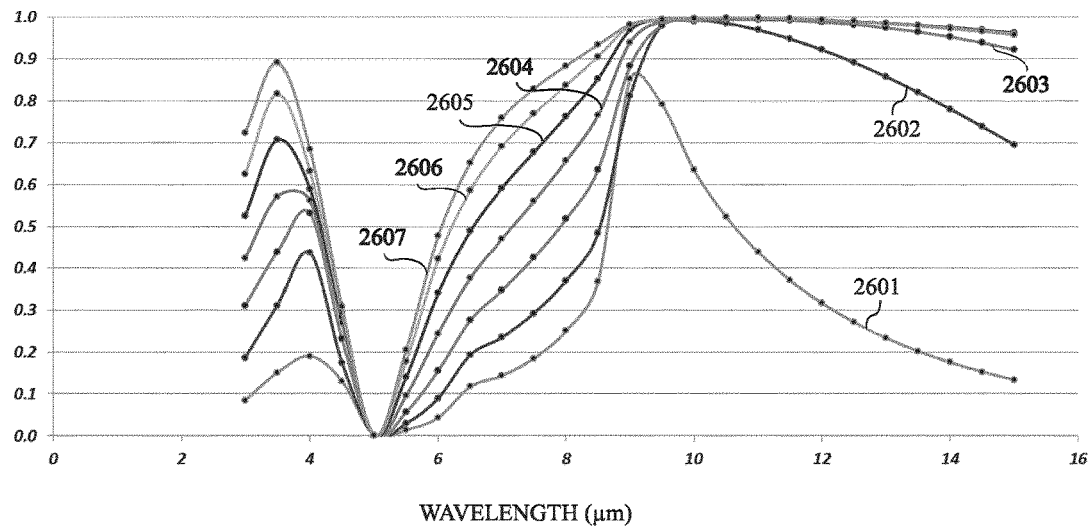
Figure 26Q:
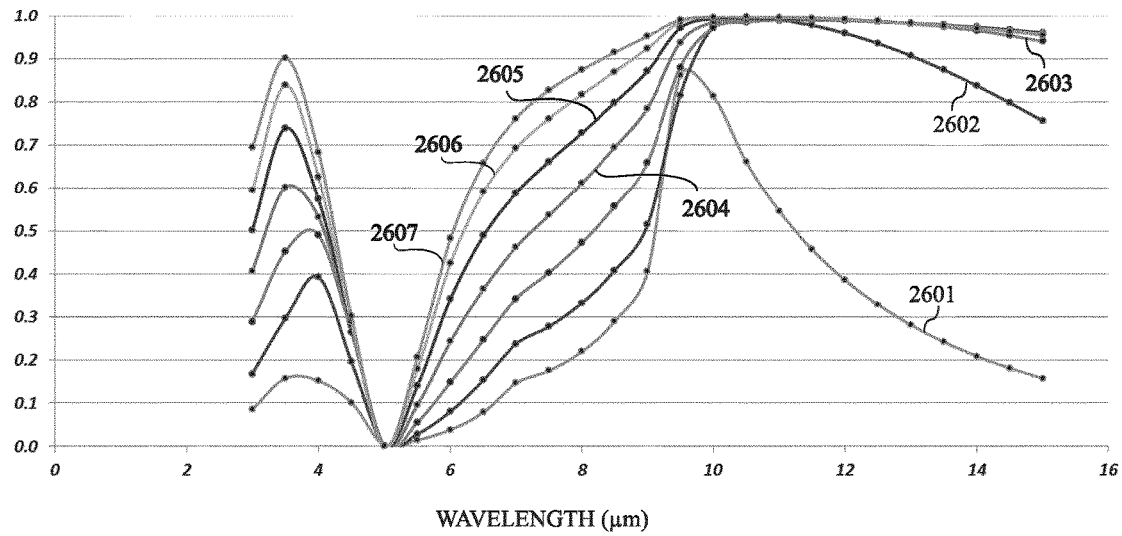
Figure 26R:
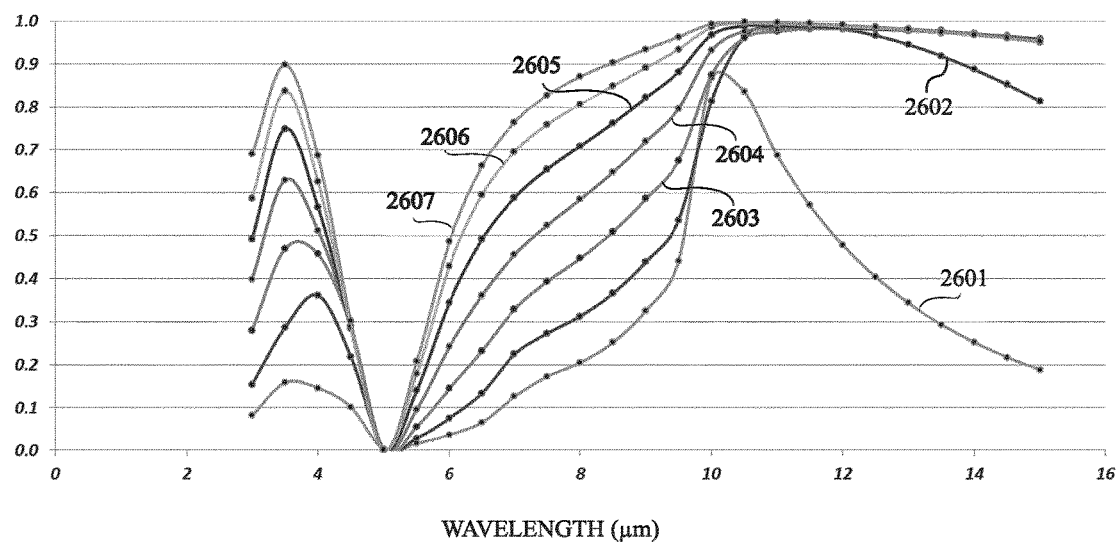
Figure 28:
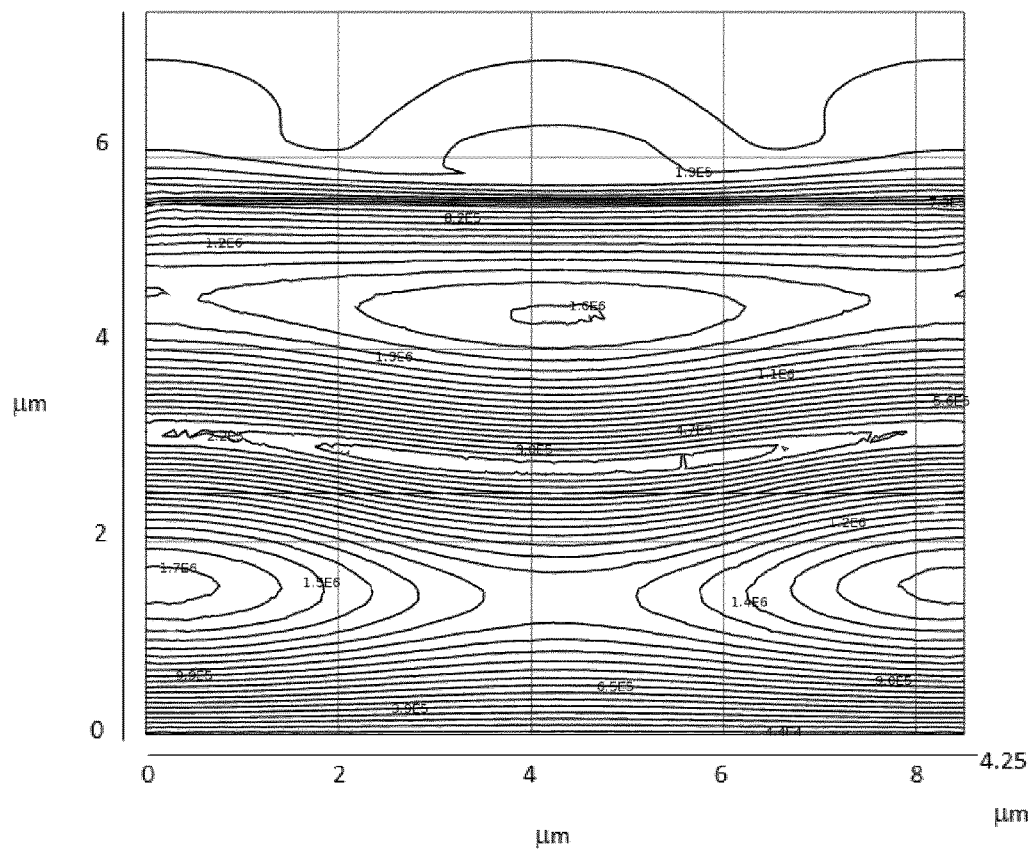
FIGS. 28 and 29 are graphs showing a spatial distribution of the electric field and magnetic field respectively in a pixel of a microbolometer having an absorption layer of 6 nm in thickness, a pixel fill factor of 0.3, and for a light wavelength of 6 µm.
Figure 29:
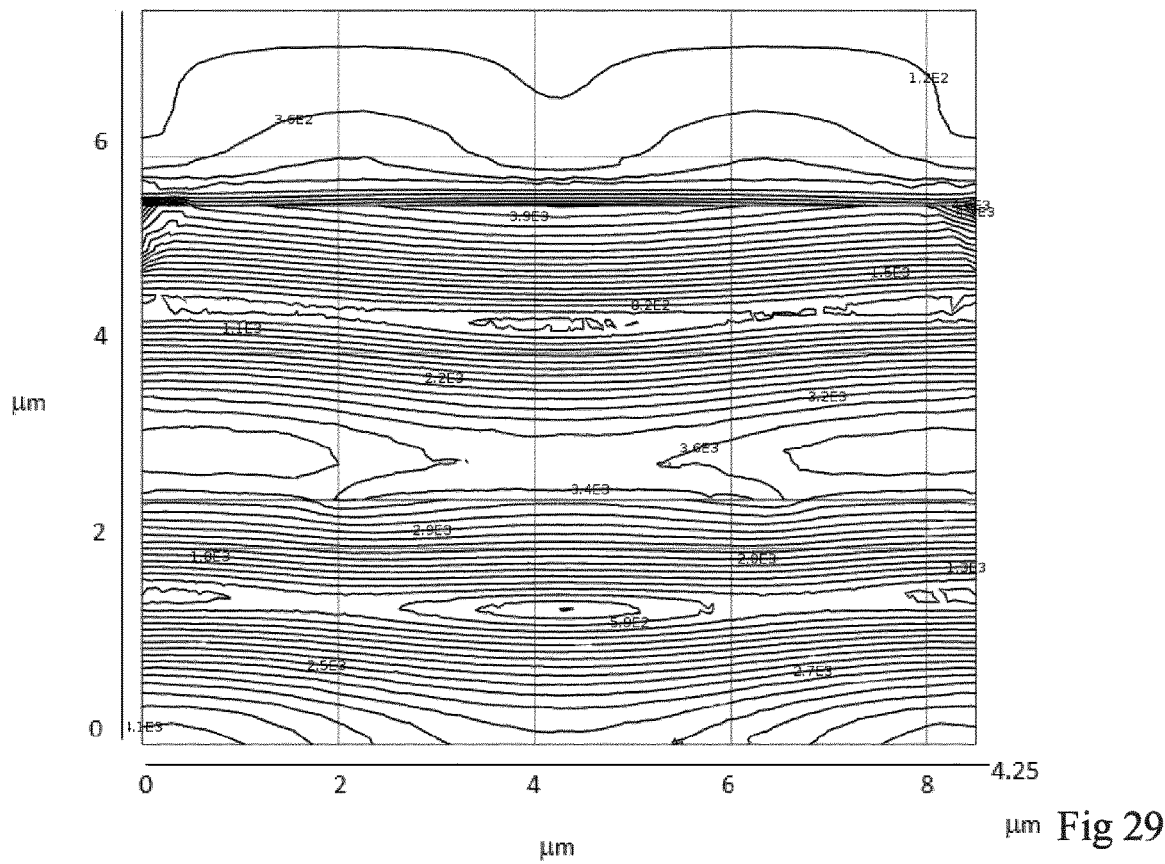
Figures 30, 31:
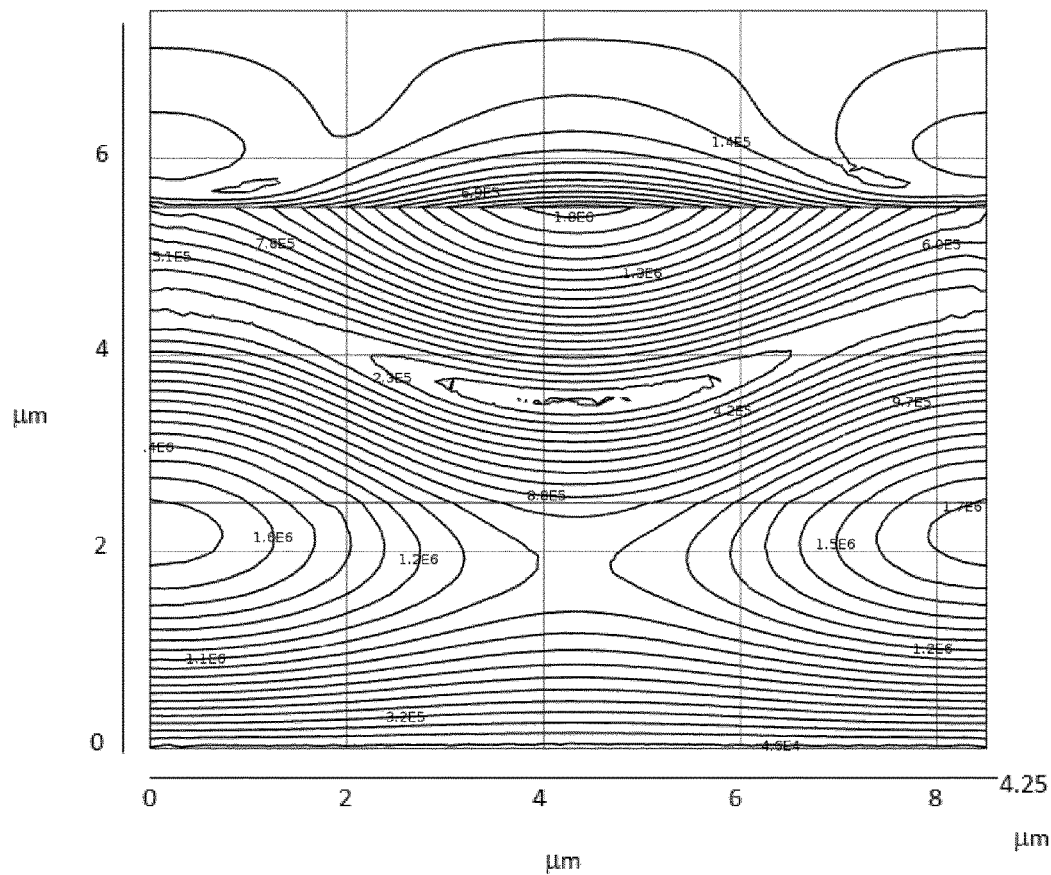
FIGS. 30 and 31 are graphs showing a spatial distribution of the electric field and magnetic field respectively in a pixel of a microbolometer having an absorption layer of 6 nm in thickness, a pixel fill factor of 0.3, and for a light wavelength of 8 µm.
Figure 32:
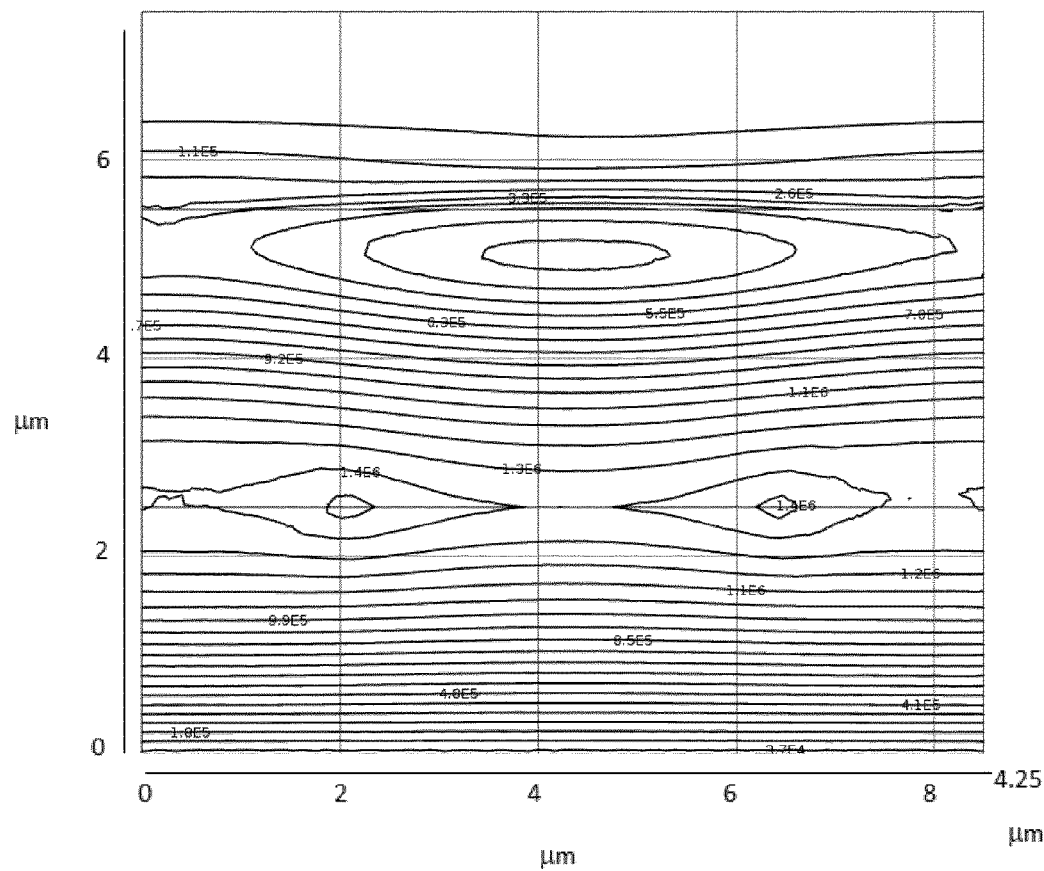
FIGS. 32 and 33 are graphs showing a spatial distribution of the electric field and magnetic field respectively in a pixel of a microbolometer having an absorption layer of 6 nm in thickness, a pixel fill factor of 0.3, and for a light wavelength of 10 µm.
Figure 33:
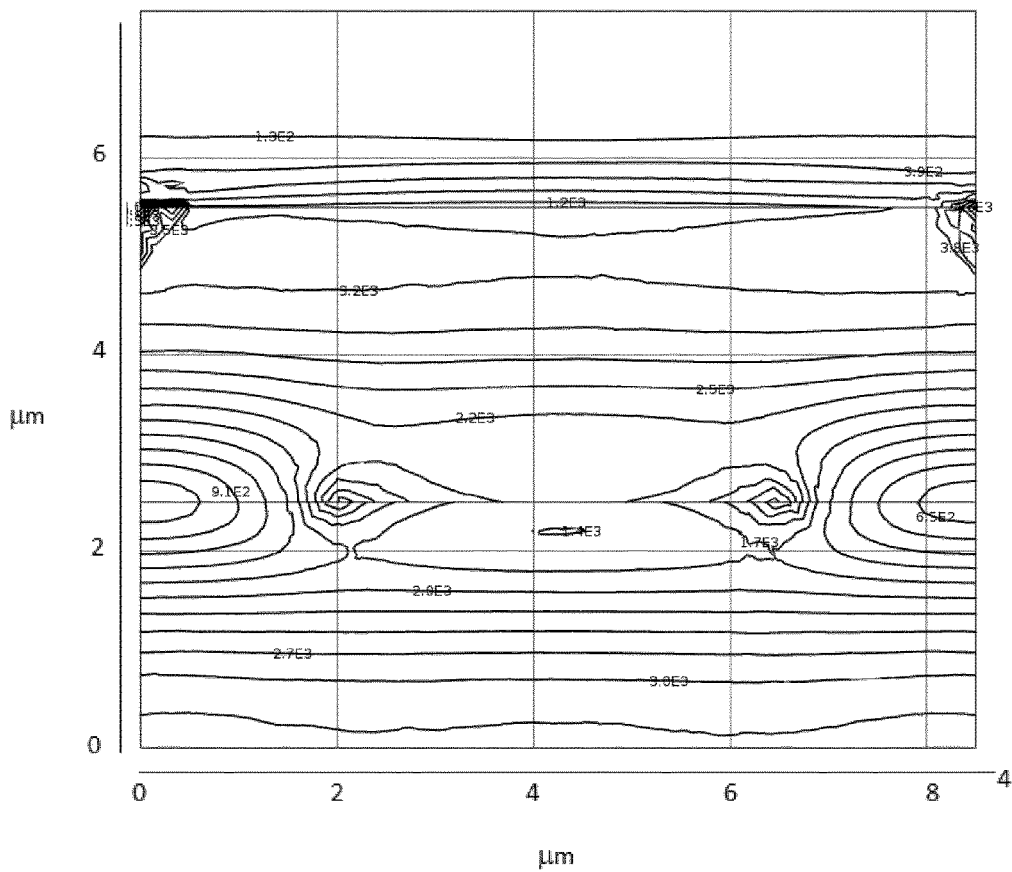
Figure 34:
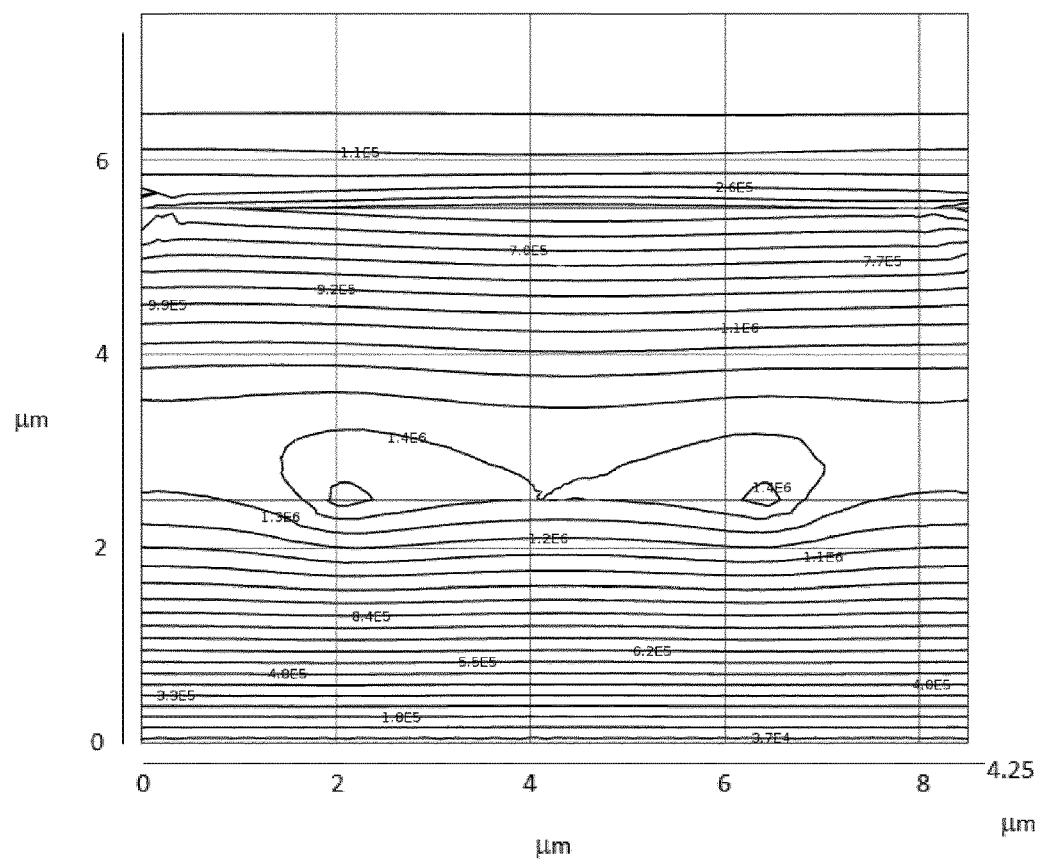
FIGS. 34 and 35 are graphs showing a spatial distribution of the electric field and magnetic field respectively in a pixel of a microbolometer having an absorption layer of 6 nm in thickness, a pixel fill factor of 0.3, and for a light wavelength of 12 µm.
Figure 35:
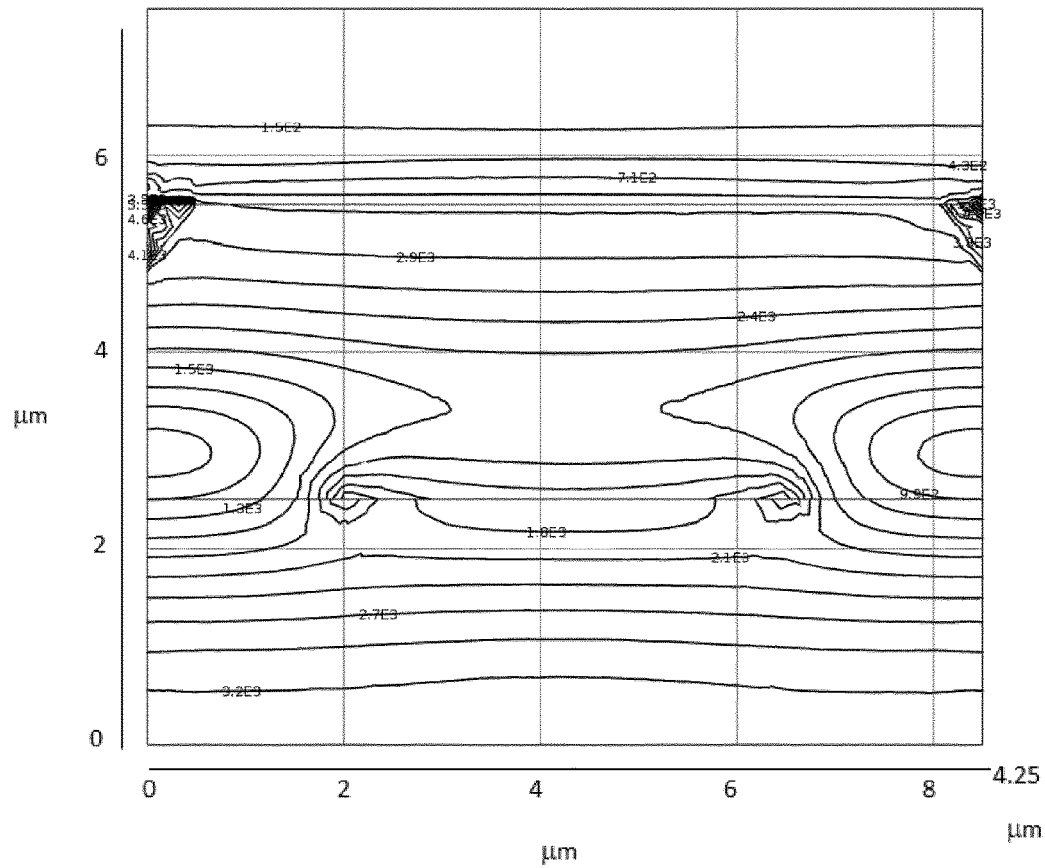
Figure 36:
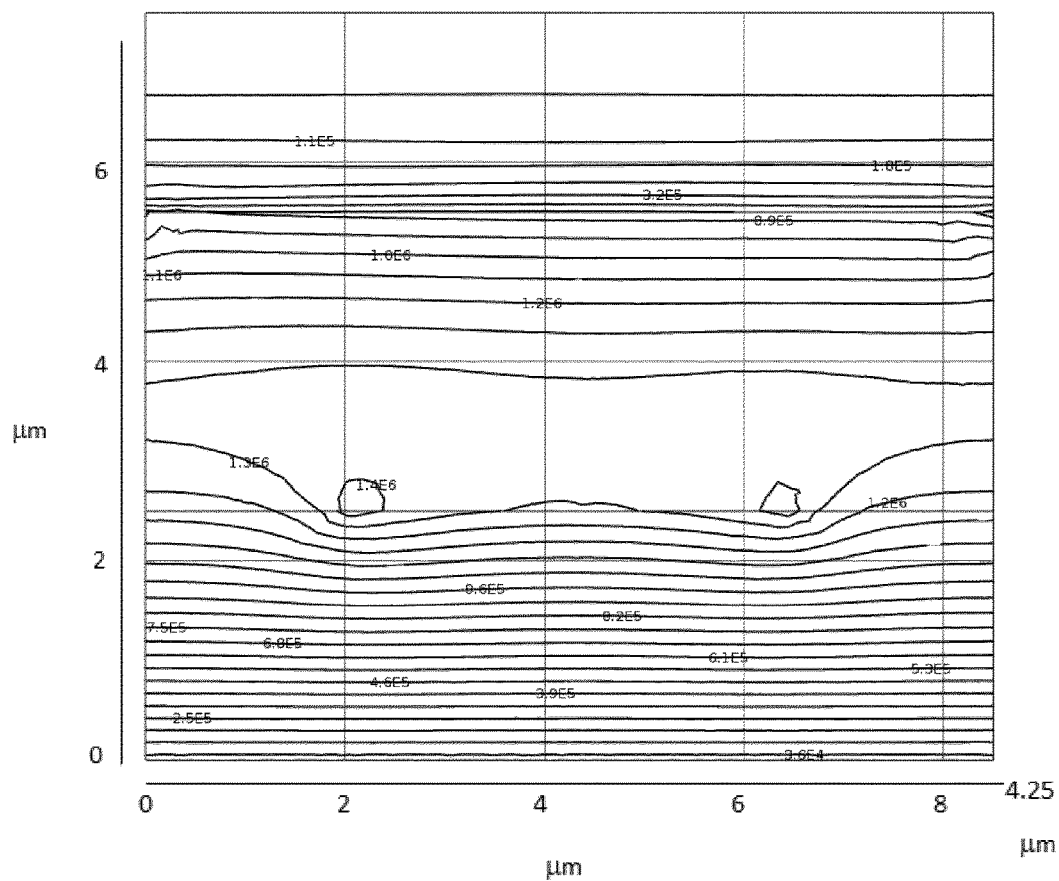
FIGS. 36 and 37 are graphs showing a spatial distribution of the electric field and magnetic field respectively in a pixel of a microbolometer having an absorption layer of 6 nm in thickness, a pixel fill factor of 0.3, and for a light wavelength of 14 µm.
Figure 37:
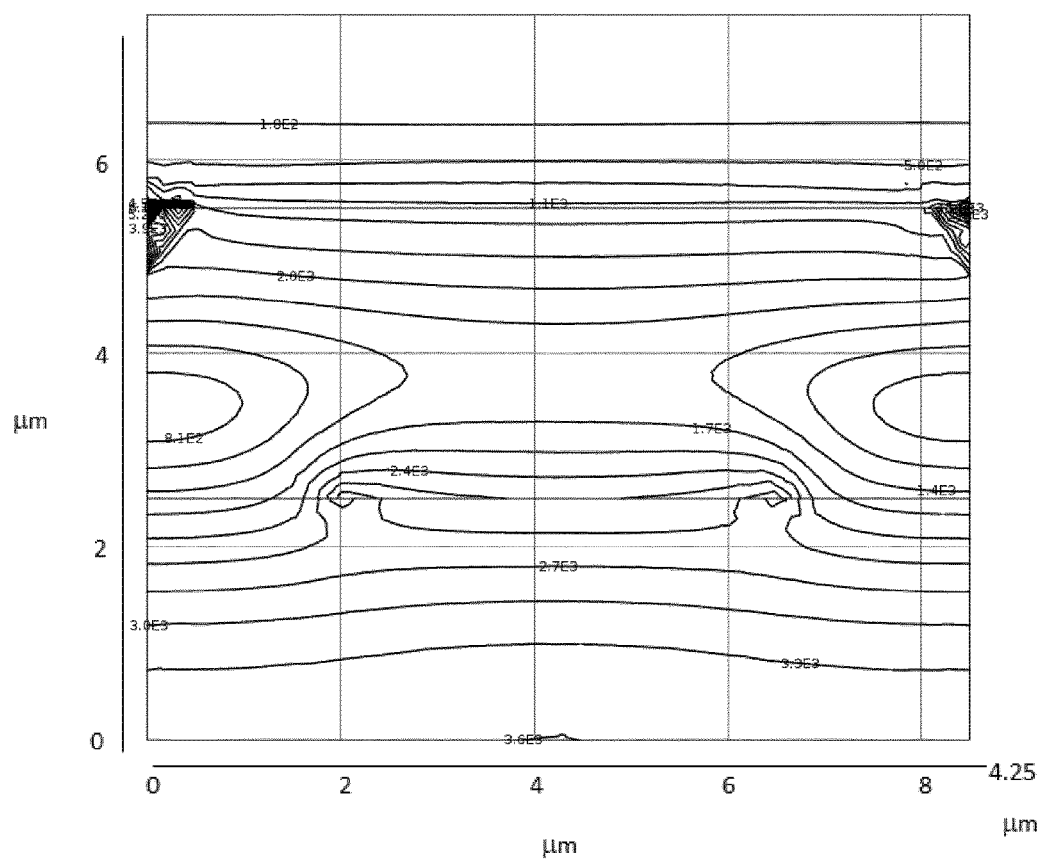
Figure 38:
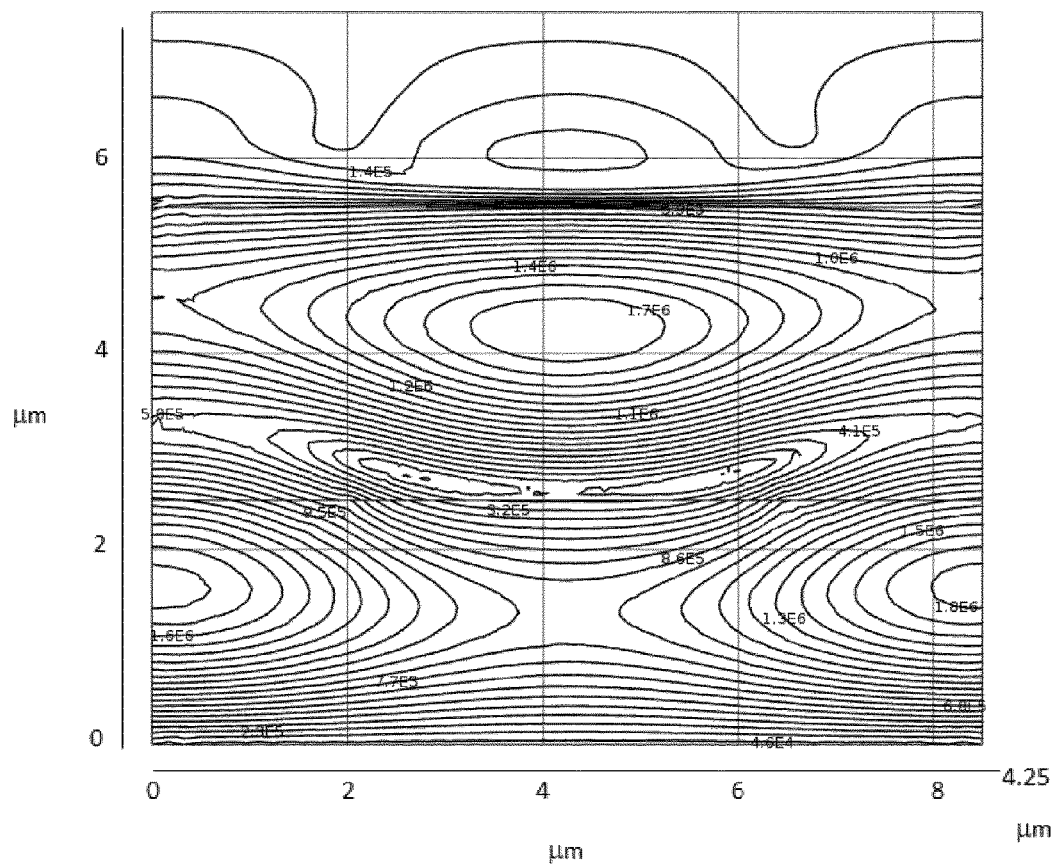
FIGS. 38 and 39 are graphs showing a spatial distribution of the electric field and magnetic field respectively in a pixel of a microbolometer having an absorption layer of 22 nm in thickness, a pixel fill factor of 0.3, and for a light wavelength of 6 µm.
Figure 39:
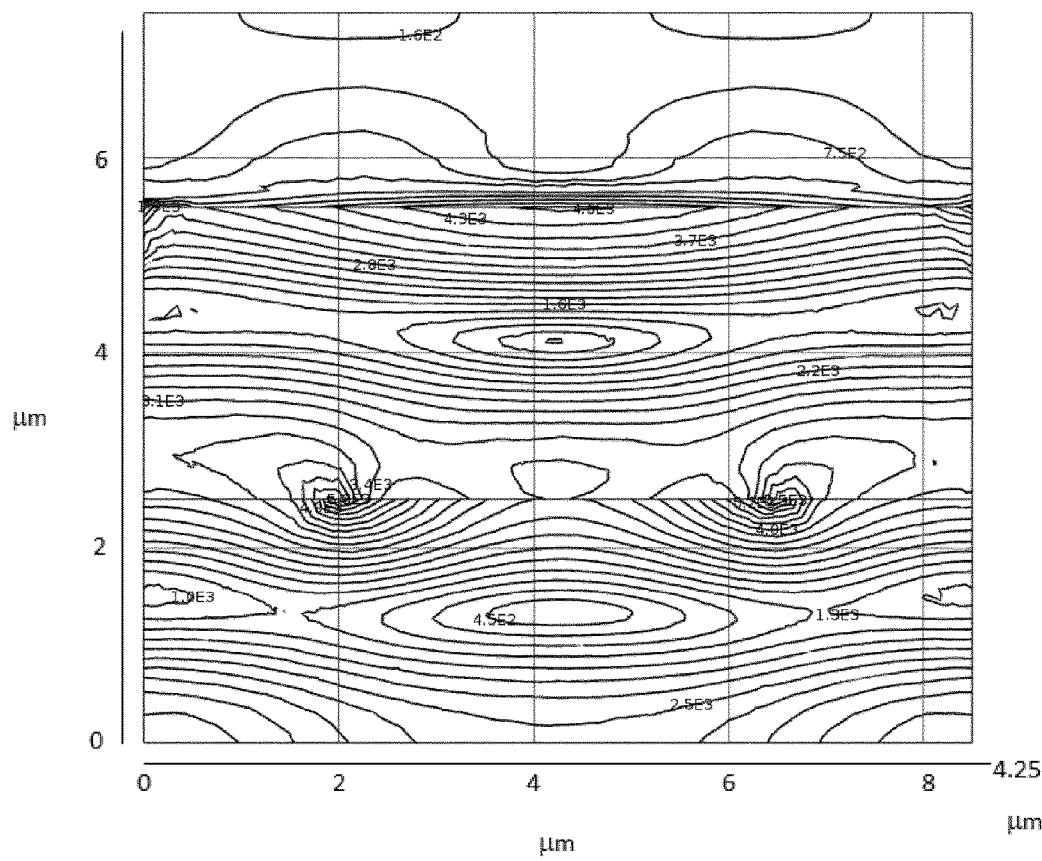

FIGS. 26F and 26G correspond to a Fabry-Perot cavity height of 5 μm and pixel pitches of 12 μm and 18 μm respectively.

FIGS. 26H to 26R are graphs showing an absorption rate, of an absorption layer of a microbolometer pixel having a Fabry-Perot cavity height of 2.5 μm, as a function of the light wavelength, for the same seven different pixel fill factors and absorption layer thicknesses as in FIG. 26A, the corresponding curves being labelled with the same references as in FIG. 26A. The FIGS. 26H to 26R respectively show examples with pixel pitches of 5 μm, 5.5 μm, 6 μm, 6.5 μm, 7 μm, 7.5 μm, 8 μm, 8.5 μm, 9 μm, 9.5 μm and 10 μm, and demonstrate that the filtering function is particularly apparent when the pixel pitch is in the range 2.4 h to 3.6 h, corresponding to the range 6 μm to 9 μm, and particularly for fill factors of at least 0.2.

It should be noted that if plots were made similar to those of FIGS. 26H to 26R, but with quarter-wave cavity heights of 1.5 μm, 5 μm, or anywhere in between, similar curves would be obtained, but with the x-axis scaled in view of the targeted wavelengths.

Common Aspects

FIGS. 28 to 47 are graphs showing the spatial distribution of electric and magnetic fields in a pixel, such as the pixel 104 or 500 described above, in the case of a pixel pitch of 8.5 μm, and a quarter-wave cavity height h of 2.5 μm. With reference also to FIG. 2, in the vertical scale shown in the graphs of FIGS. 28 to 47, the reflective layer 204 is positioned at approximately 0 μm, and the absorption layer 210 is positioned at approximately 2.5 μm.

The electric fields are for example represented by contours corresponding to electric field magnitudes expressed in V/m in the graphs. The magnetic fields are for example represented by contours associated with magnetic field magnitudes expressed in A/m in the graphs.

The graphs of FIGS. 28 to 37 show the spatial distribution of the electric and magnetic fields in a pixel of a microbolometer having an absorption layer of 6 nm in thickness and a pixel fill factor of 0.30. Among these figures, FIGS. 28 and 29 respectively represent the distribution of electric and magnetic fields in the case of light at a wavelength of 6 μm, FIGS. 30 and 31 respectively represent the distribution of electric and magnetic fields in the case of light at a wavelength of 8 μm, FIGS. 32 and 33 respectively represent the distribution of electric and magnetic fields in the case of light at a wavelength of 10 μm, FIGS. 34 and 35 respectively represent the distribution of electric and magnetic fields in the case of light at a wavelength of 12 μm, and FIGS. 36 and 37 respectively represent the distribution of electric and magnetic fields in the case of light at a wavelength of 14 μm.

The graphs of FIGS. 38 to 47 show the spatial distribution of the electric and magnetic fields in a pixel of a microbolometer having an absorption layer of 22 nm in thickness and a pixel fill factor of 0.30. Among these figures, FIGS. 38 and 39 respectively represent the distribution of electric and magnetic fields in the case of light at a wavelength of 6 μm, FIGS. 40 and 41 respectively represent the distribution of electric and magnetic fields in the case of light at a wavelength of 8 μm, FIGS. 42 and 43 respectively represent the distribution of electric and magnetic fields in the case of light at a wavelength of 10 μm, FIGS. 44 and 45 respectively represent the distribution of electric and magnetic fields in the case of light at a wavelength of 12 μm, and FIGS. 46 and 47 respectively represent the distribution of electric and magnetic fields in the case of light at a wavelength of 14 μm.

It can be seen that, at the light wavelength of 6 μm (FIGS. 28, 29, 38 and 39), the effects of the Fabry-Perot cavity are dominant, while in the case of the relatively thick absorption layer (FIGS. 38 and 39), there is a diffractive effect resulting in high decentralized field strengths.

Figure 40:
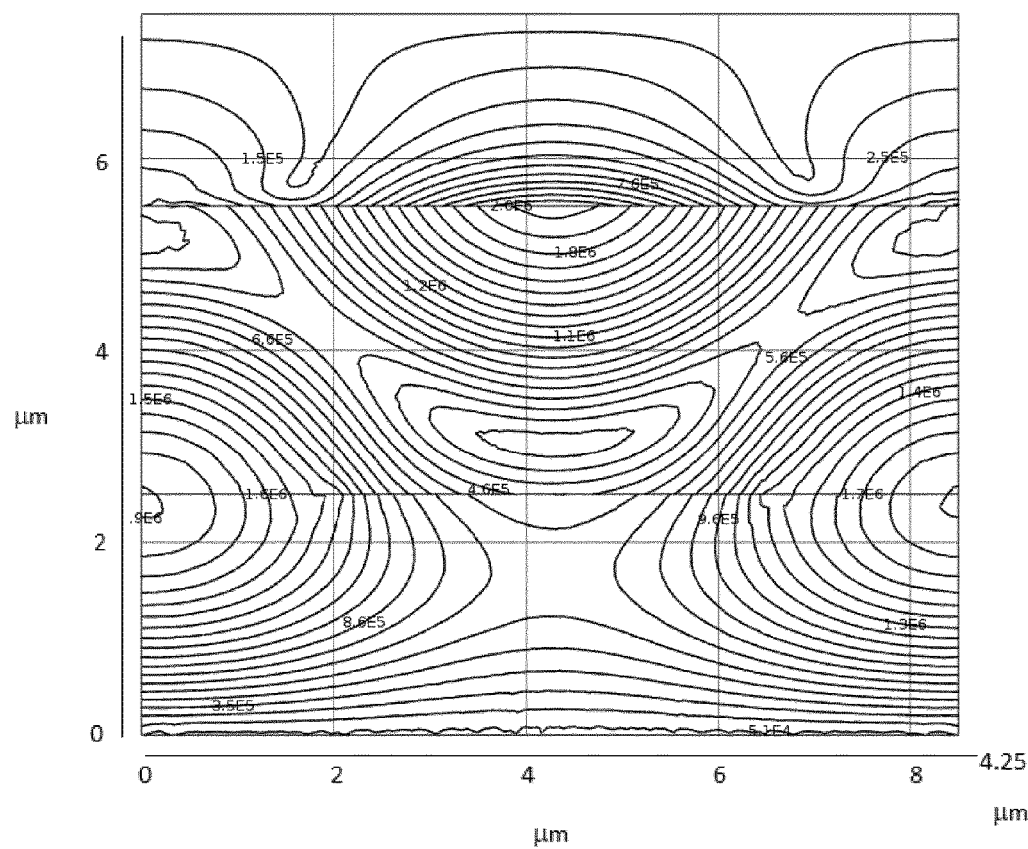
FIGS. 40 and 41 are graphs showing a spatial distribution of the electric field and magnetic field respectively in a pixel of a microbolometer having an absorption layer of 22 nm in thickness, a pixel fill factor of 0.3, and for a light wavelength of 8 µm.
Figure 41:
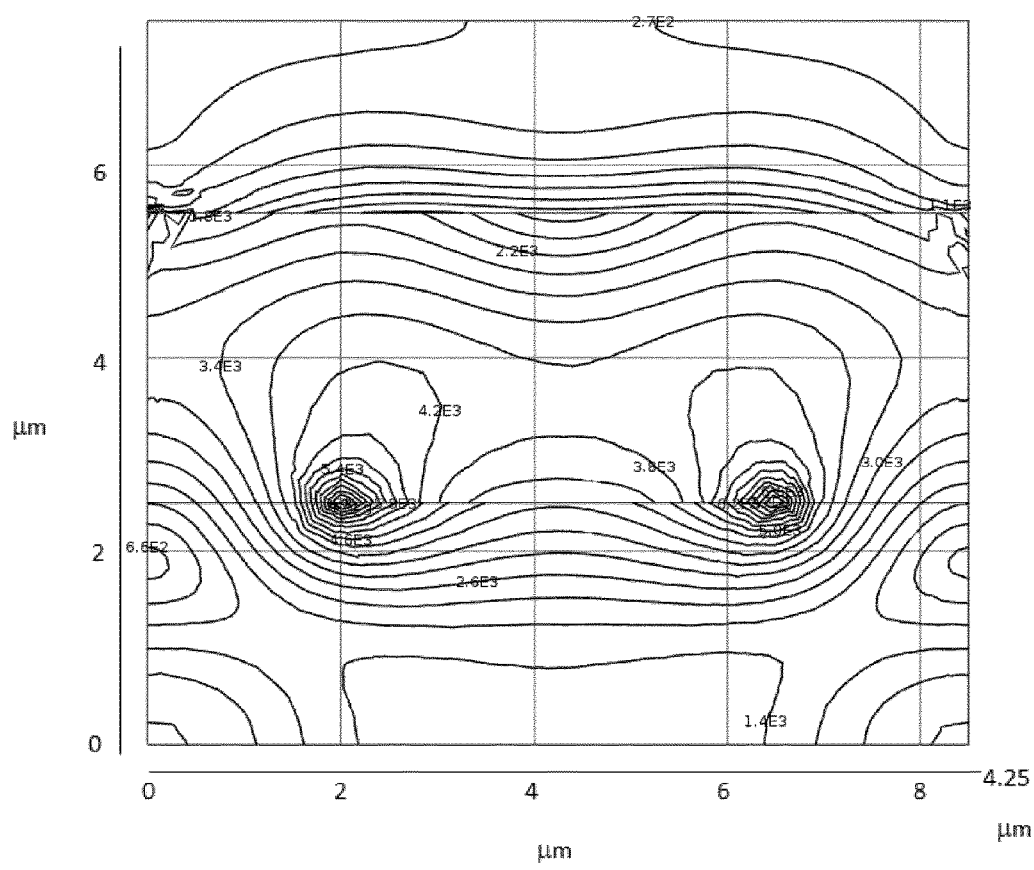
Figure 42:
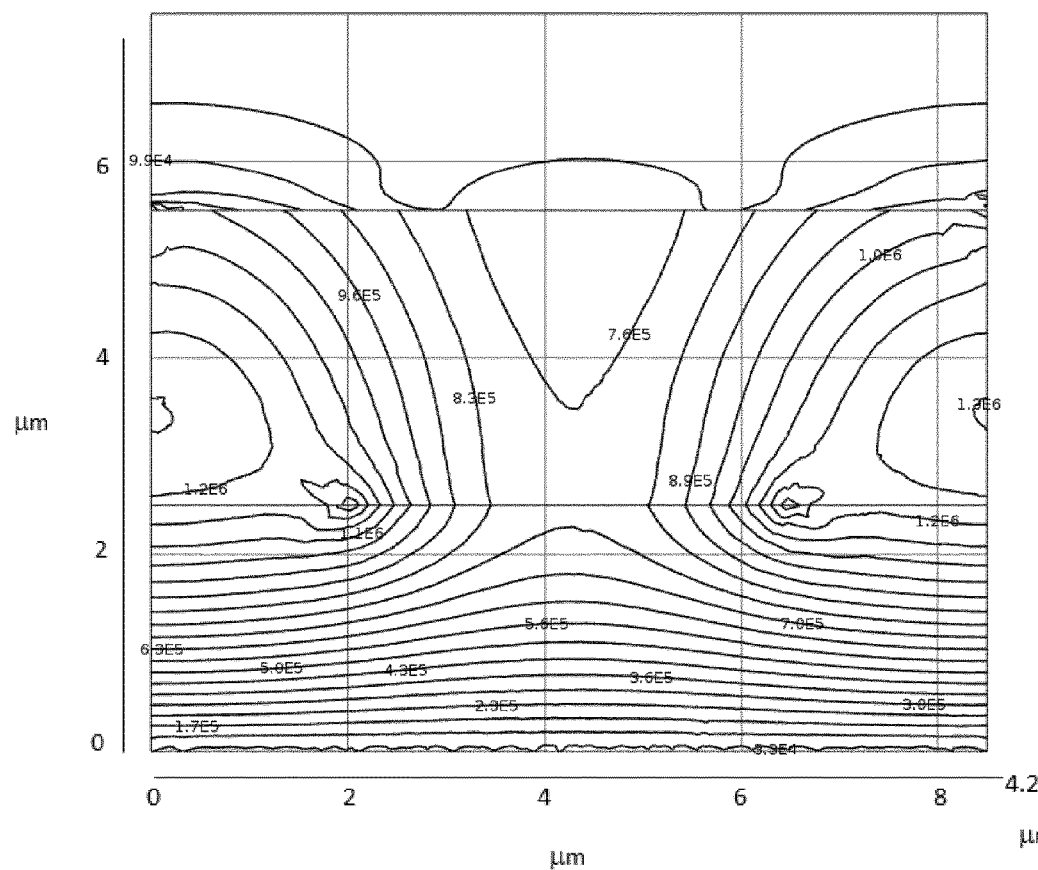
FIGS. 42 and 43 are graphs showing a spatial distribution of the electric field and magnetic field respectively in a pixel of a microbolometer having an absorption layer of 22 nm in thickness, a pixel fill factor of 0.3, and for a light wavelength of 10 µm.
Figure 43:
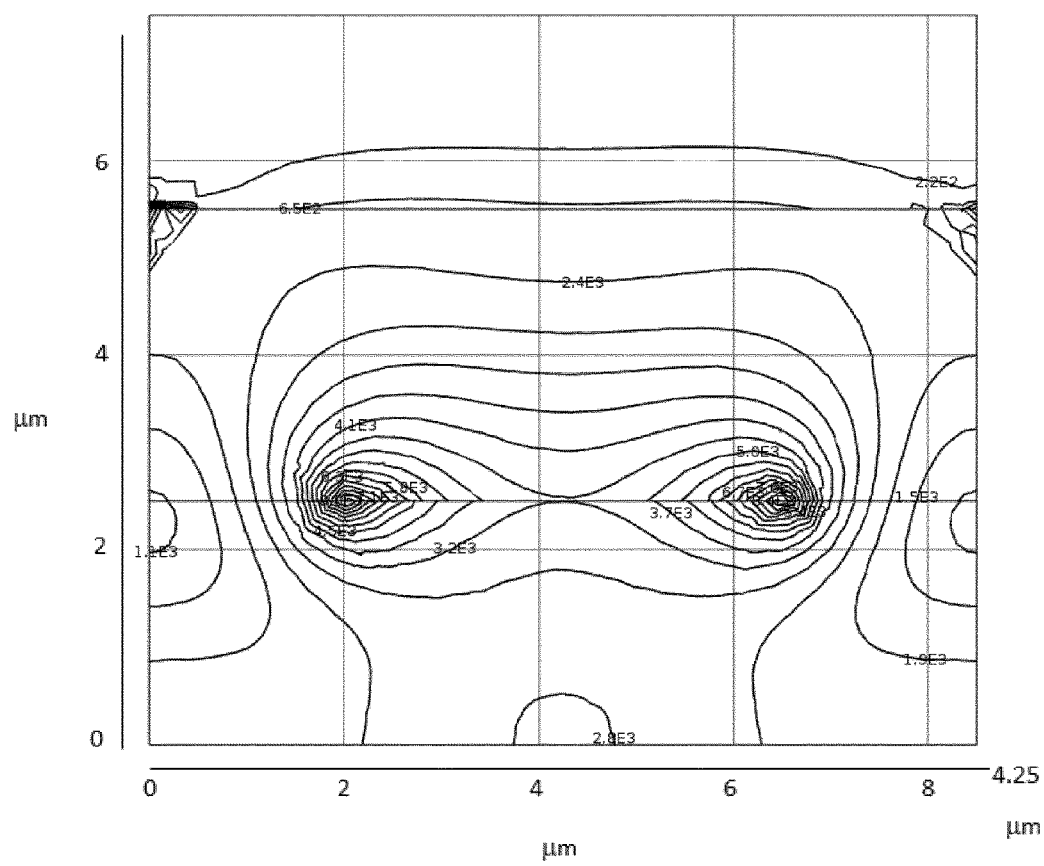
Figure 44:
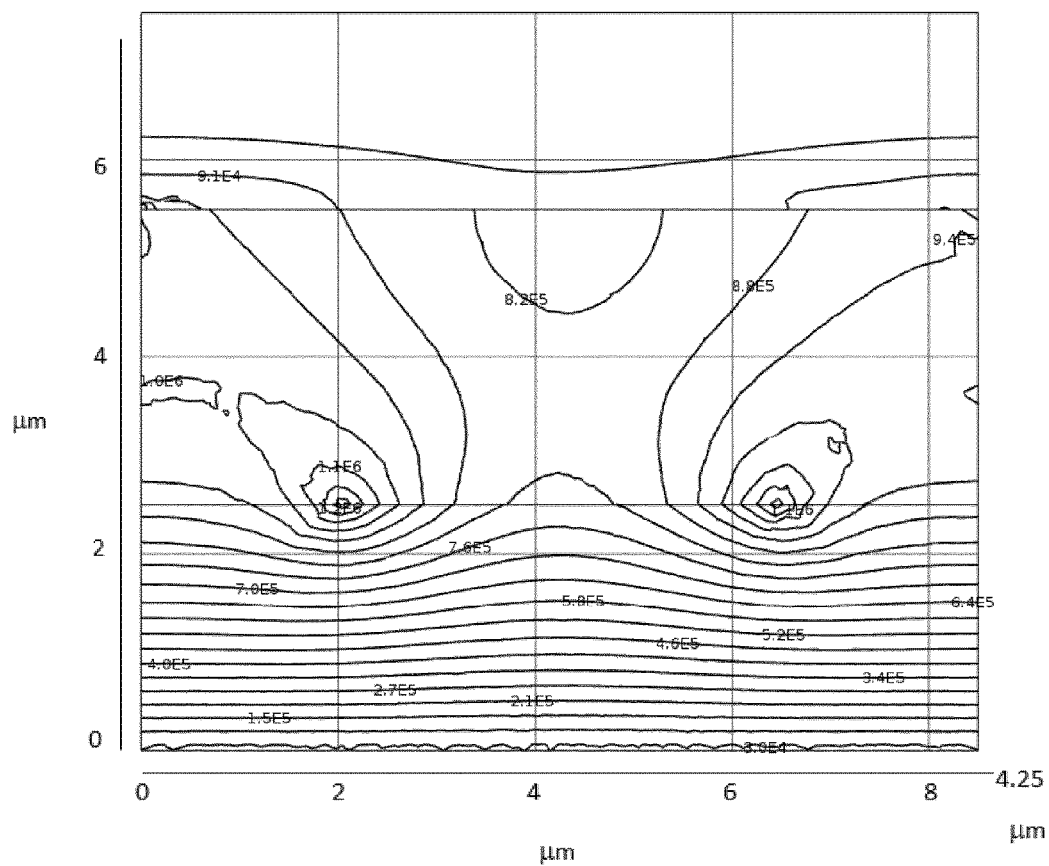
FIGS. 44 and 45 are graphs showing a spatial distribution of the electric field and magnetic field respectively in a pixel of a microbolometer having an absorption layer of 22 nm in thickness, a pixel fill factor of 0.3, and for a light wavelength of 12 µm.
Figure 45:
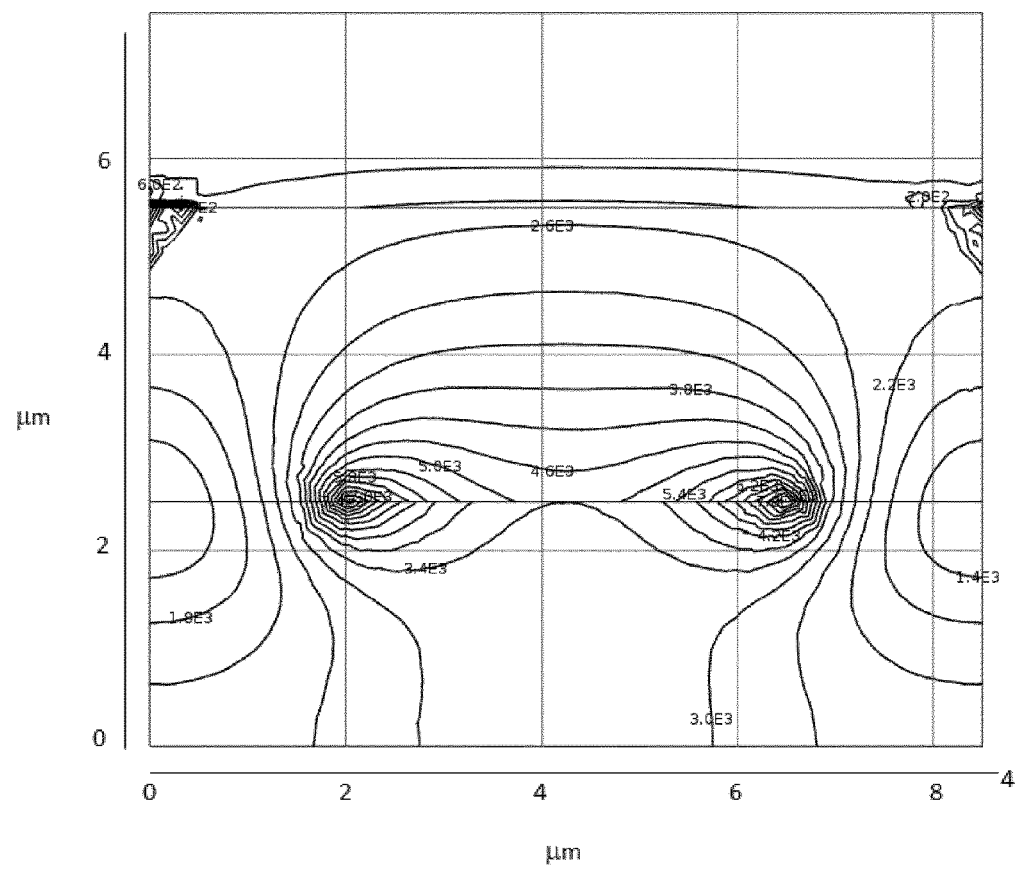
Figure 46:
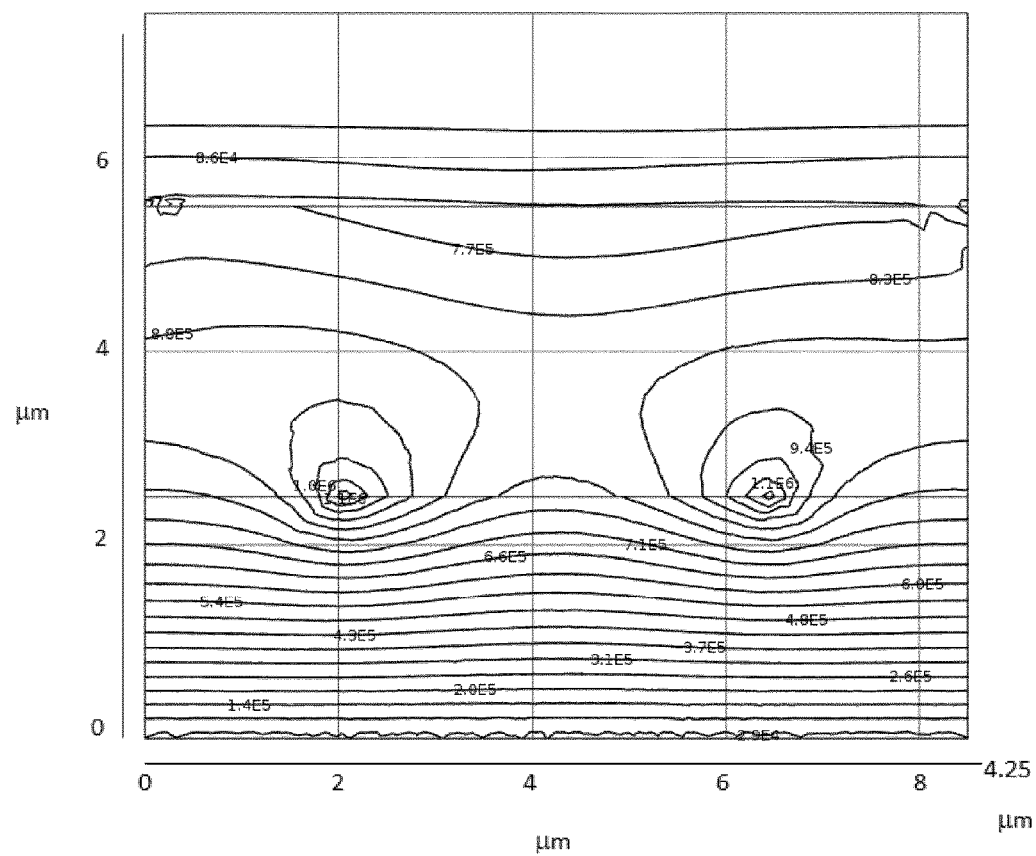
FIGS. 46 and 47 are graphs showing a spatial distribution of the electric field and magnetic field respectively in a pixel of a microbolometer having an absorption layer of 22 nm in thickness, a pixel fill factor of 0.3, and for a light wavelength of 14 µm.
Figure 47:
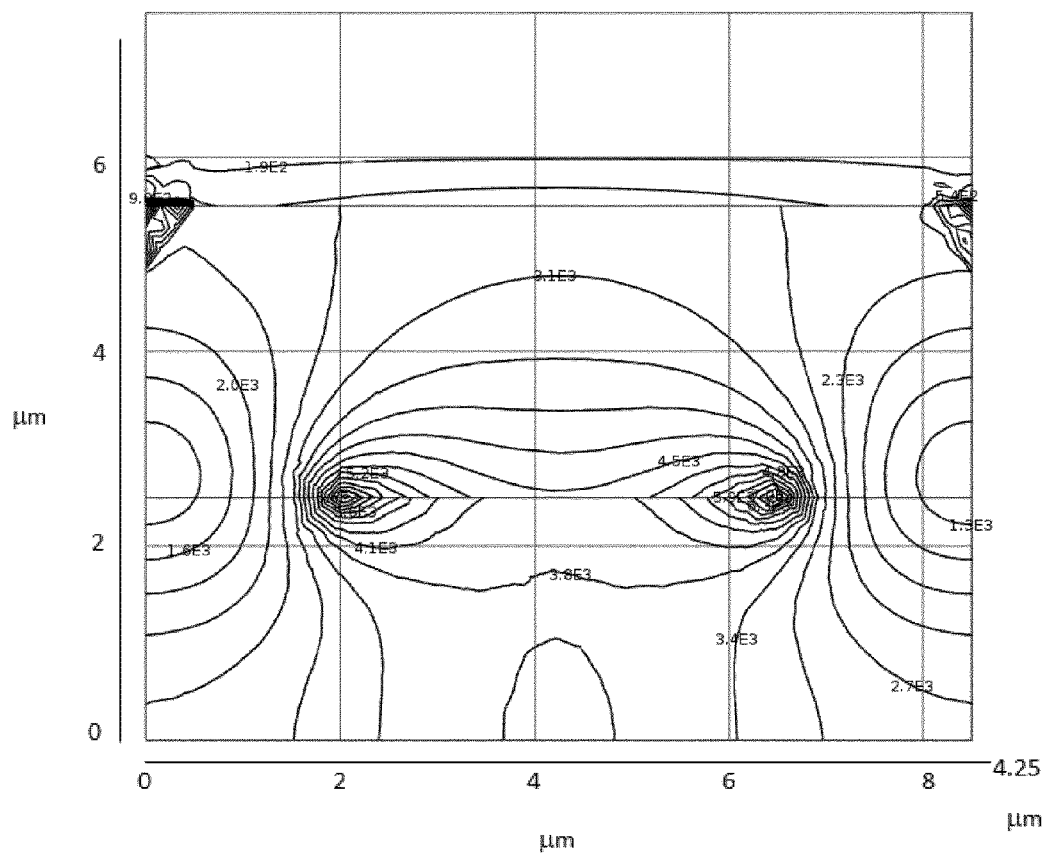

For light at the wavelength of 8 μm (FIGS. 30, 31, 40 and 41), the diffraction effect is dominant, particularly for the relatively thick absorption layer (FIGS. 40 and 41). This phenomenon is also amplified as the fill factor falls. Furthermore, the field magnitude is strongly amplified for the relatively thick absorption layer.

For light at wavelengths of 10 μm, 12 μm and 14 μm, in the case of the relatively thin thickness of the absorption layer (FIGS. 32 to 37), Fabry-Perot coupling dominates, whereas for the thicker absorption layer (FIGS. 42 to 47), the Fabry-Perot coupling is replaced by a phenomenon characterized by a concentration of the electric field at the edges of the absorption layer, and a confinement of the magnetic field under the absorber.

An advantage of the embodiments described herein in relation with the first aspect is that a relatively high absorption rate can be achieved while using a relatively compact microbolometer array.

An advantage of the embodiments described herein in relation with the second aspect is that a filtering function can be obtained, thereby relaxing the constraints on optical filters of the microbolometer.

Furthermore, the present inventor has found that the reduction in the pixel fill factor to the range of 0.10 to 0.50 and the increase in the thickness of the absorption layer does not lead to an increase in the cross-talk between pixels, based on simulations carried out for absorption layers of 6 and 18 nm in thickness.

Various embodiments and variants have been described. Those skilled in the art will understand that certain features of these embodiments can be combined and other variants will readily occur to those skilled in the art. For example, it will be apparent to those skilled in the art that, while the example of absorption layers formed of TiN have been detailed, the principles described herein could be applied to other materials, including different metals.

The invention claimed is:

1. A microbolometer comprising an array of pixels, each pixel comprising one or more detection cells, each detection cell comprising an absorption layer forming a quarter-wave cavity having a height h of between 1.5 and 5 μm, wherein the pitch of the detection cells in at least one axis in a plane of the pixel array is in the range 2.4 h to 3.6 h.

2. The microbolometer of claim 1, wherein a pixel fill factor FF of the absorption layer of the one or more detection cells in each pixel is in a range 0.20 to 0.70.

3. The microbolometer of claim 1, wherein a pixel fill factor FF of the absorption layer of the one or more detection cells in each pixel is in a range 0.20 to 0.50.

4. The microbolometer of claim 1, wherein the pitch of the detection cells is in the range 4 to 15 μm.

5. The microbolometer of claim 1, wherein the pitch of the detection cells is in the range 5 to 11 μm.

6. The microbolometer of claim 1, wherein the absorption layer is a metal layer having a sheet resistance of 189 ohm/sq or less.

7. The microbolometer of claim 1, wherein the absorption layer is a metal layer having a sheet resistance of 126 ohm/sq or less.

8. The microbolometer of claim 6, wherein the absorption layer is formed of TiN.

9. The microbolometer of claim 1, wherein the cavity height (h) is of between 1.5 and 3.5 μm.

10. The microbolometer of claim 1, wherein each pixel of the array has:
- a pixel fill factor FF equal to or greater than 0.40 and less than 0.50 and a sheet resistance Rs of the absorption layer of at least 75 ohm/sq; or
- a pixel fill factor FF equal to or greater than 0.30 and less than 0.40 and a sheet resistance Rs of the absorption layer of at least 50 ohm/sq; or
- a pixel fill factor FF equal to or greater than 0.20 and less than 0.30 and a sheet resistance Rs of the absorption layer of at least 25 ohm/sq; or
- a pixel fill factor FF equal to or greater than 0.10 and less than 0.20 and a sheet resistance Rs of the absorption layer of at least 16 ohm/sq.

11. The microbolometer of claim 10, wherein the ratio Rs/FF of each pixel of the array is between 200 and 600 ohm/sq.

12. The microbolometer of claim 10, wherein the ratio Rs/FF of each pixel of the array is within 20 percent of 377 ohm/sq.

13. The microbolometer of claim 1, wherein each detection cell comprises a membrane comprising the absorption layer, a thermal layer and a dielectric layer.

14. A method of fabricating a microbolometer, the method comprising forming an array of pixels, each pixel comprising one or more detection cells, wherein forming the array comprises:
- forming each detection cell to comprise an absorption layer forming a quarter-wave cavity-having a height h of between 1.5 and 5 μm; and
- forming the detection cells to have a pitch, in at least one axis in the plane of the pixel array, in the range 2.4 h to 3.6 h.

15. The method of claim 14, wherein a pixel fill factor FF of the absorption layer of the one or more detection cells in each pixel is in a range 0.20 to 0.70.

* * * * *